(12) United States Patent
Muir et al.

(10) Patent No.: US 12,711,426 B2
(45) Date of Patent: Aug. 18, 2026

(54) COMPUTE AGNOSTIC MACHINE LEARNING PROJECT WORKSPACES

(71) Applicant: Optum, Inc., Minnetonka, MN (US)

(72) Inventors: Cory Muir, Savage, MN (US); Anand Dhandhania, Renton, WA (US); Vivek Bhadauria, Bothell, WA (US); Vasant Manohar, Apex, NC (US)

(73) Assignee: Optum, Inc., Minnetonka, MN (US)

( * ) Notice: Subject to any disclaimer, the term of this patent is extended or adjusted under 35 U.S.C. 154(b) by 456 days.

(21) Appl. No.: 18/447,615

(22) Filed: Aug. 10, 2023

(65) Prior Publication Data

US 2025/0053861 A1 Feb. 13, 2025

(51) Int. Cl.
*G06N 20/00* (2019.01)

(52) U.S. Cl.
CPC .................................... *G06N 20/00* (2019.01)

(58) Field of Classification Search
CPC ..................................................... G06N 20/00
See application file for complete search history.

(56) References Cited

U.S. PATENT DOCUMENTS 1,372,871 A 3/1921 Droll
6,901,403 B1 5/2005 Bata et al.
6,950,823 B2 9/2005 Amiri et al.
7,403,956 B2 7/2008 Vaschillo et al.
7,490,031 B1 * 2/2009 Qiu .......................... G06F 8/38 703/22
7,812,826 B2 10/2010 Ording et al.
7,831,594 B2 11/2010 Mehta et al.
(Continued)

FOREIGN PATENT DOCUMENTS

CN 112801302 A 5/2021
CN 115943536 A 4/2023
(Continued)

OTHER PUBLICATIONS

Advisory Action (PTOL-303) Mailed on Jan. 24, 2025 for U.S. Appl. No. 18/365,485, 2 page(s).
(Continued)

*Primary Examiner* — Eliyah S. Harper
(74) *Attorney, Agent, or Firm* — Alston & Bird LLP

(57) ABSTRACT

Various embodiments of the present disclosure provide machine learning configuration techniques for seamlessly leveraging compute functionalities from across a plurality of disparate third-party computing resources. The configuration techniques include receiving a first-party workspace request that identifies a third-party computing resource and in response to the first-party workspace request: generating a compute agnostic project workspace hosted by a first-party computing resource, initiating the generation of a third-party workspace hosted by the third-party computing resource, and initiating the configuration of a first-party routine set within the third-party workspace. The first-party routine set includes a plurality of webhooks that facilitate communication between the first-party computing resource and the third-party computing resource, thereby enabling a first-party to leverage multiple different, traditionally incompatible, computing functionalities from one centralized location.

20 Claims, 10 Drawing Sheets

(56) References Cited

U.S. PATENT DOCUMENTS 7,924,271 B2 4/2011 Christie et al.
7,945,581 B2 5/2011 Bayliss et al.
8,214,308 B2 7/2012 Chu
8,223,134 B1 7/2012 Forstall et al.
8,341,104 B2 12/2012 Manickam et al.
8,515,975 B1 8/2013 Federici
8,539,345 B2 9/2013 Appleyard et al.
8,572,031 B2 10/2013 Merriman et al.
8,762,406 B2 6/2014 Ho et al.
8,930,410 B2 1/2015 Alton et al.
9,116,812 B2 8/2015 Joshi et al.
9,246,776 B2 1/2016 Ellsworth et al.
9,390,112 B1 7/2016 Daly et al.
9,489,440 B2 11/2016 Stritzel et al.
9,558,230 B2 1/2017 Hollifield et al.
9,600,504 B2 3/2017 Marrelli et al.
9,646,226 B2 5/2017 Wang et al.
10,185,728 B2 1/2019 Nath et al.
10,229,161 B2 3/2019 Kakarla et al.
10,296,524 B1 5/2019 Tung et al.
10,409,802 B2 9/2019 Spitz et al.
10,698,954 B2 6/2020 Piechowicz et al.
10,719,301 B1 7/2020 Dasgupta et al.
10,762,539 B2 9/2020 Murugesan et al.
10,795,598 B1 10/2020 Vohra
10,817,483 B1 10/2020 Samdani et al.
10,867,063 B1 12/2020 Avanes et al.
10,872,236 B1 12/2020 Elor et al.
10,896,176 B1 1/2021 Creedon et al.
10,908,926 B2 2/2021 Coven et al.
11,074,107 B1 7/2021 Nandakumar
11,080,336 B2 * 8/2021 Van Dusen ............ G06Q 10/10
11,093,500 B2 8/2021 Gladwin et al.
11,094,029 B2 8/2021 Kalamkar et al.
11,100,420 B2 8/2021 Dirac et al.
11,113,784 B2 9/2021 Ray et al.
11,119,980 B2 9/2021 Szczepanik et al.
11,126,632 B2 9/2021 Pal et al.
11,140,061 B1 10/2021 Sanders et al.
11,157,470 B2 10/2021 Schuetz
11,204,851 B1 12/2021 Iyengar et al.
11,281,673 B2 3/2022 Nanda et al.
11,301,467 B2 4/2022 Slezak et al.
11,321,330 B1 5/2022 Pandis et al.
11,443,237 B1 9/2022 Song et al.
11,449,797 B1 9/2022 Kurniawan et al.
11,475,350 B2 10/2022 Mcmahan et al.
11,550,812 B2 1/2023 Liu et al.
11,599,813 B1 3/2023 Yuan et al.
11,620,541 B1 4/2023 Ghosh et al.
11,636,108 B1 4/2023 Xu et al.
11,853,401 B1 12/2023 Nookula et al.
12,541,687 B1 2/2026 Sindwani et al.
2004/0153435 A1 8/2004 Gudbjartsson et al.
2006/0218117 A1 9/2006 Gupta
2006/0218149 A1 9/2006 Patrick
2006/0259977 A1 11/2006 Patrick
2007/0262964 A1 11/2007 Zotov et al.
2008/0104089 A1 5/2008 Pragada et al.
2009/0309847 A1 12/2009 Russell et al.
2010/0031202 A1 2/2010 Morris et al.
2010/0315438 A1 12/2010 Horodezky et al.
2011/0013049 A1 1/2011 Thörn
2011/0074710 A1 3/2011 Weeldreyer et al.
2011/0074824 A1 3/2011 Srinivasan et al.
2012/0084711 A1 4/2012 Duarte et al.
2012/0089950 A1 4/2012 Tseng
2012/0147050 A1 6/2012 Dai et al.
2012/0159402 A1 6/2012 Nurmi et al.
2012/0210066 A1 8/2012 Joshi et al.
2012/0290592 A1 11/2012 Ishii
2012/0317096 A1 12/2012 Kaufmann et al.
2013/0086039 A1 4/2013 Salch et al.
2013/0132360 A1 5/2013 Kuznetsov et al.
2013/0159288 A1 6/2013 Nikankin
2015/0169685 A1 6/2015 Elias et al.
2015/0193697 A1 7/2015 Vasseur et al.
2015/0379430 A1 12/2015 Dirac et al.
2016/0147837 A1 5/2016 Nguyen et al.
2016/0147888 A1 5/2016 Nguyen et al.
2017/0013046 A1 1/2017 Flynn
2017/0220605 A1 8/2017 Nivala et al.
2017/0269921 A1 9/2017 Martin Vicente et al.
2017/0329466 A1 11/2017 Krenkler et al.
2018/0293276 A1 10/2018 Bae et al.
2018/0357444 A1 12/2018 Kammath et al.
2018/0375720 A1 12/2018 Yang et al.
2019/0050459 A1 2/2019 Griffith et al.
2019/0065569 A1 2/2019 Boutros et al.
2019/0146978 A1 5/2019 Beedgen et al.
2019/0156247 A1 5/2019 Faulhaber, Jr. et al.
2019/0179820 A1 6/2019 El et al.
2019/0188612 A1 * 6/2019 Cooper .................. G06Q 10/04
2019/0196890 A1 6/2019 Bucchi et al.
2019/0311372 A1 10/2019 Lindner
2019/0325353 A1 10/2019 Aftab et al.
2019/0347259 A1 11/2019 Jacob et al.
2019/0369969 A1 12/2019 Donohoe et al.
2019/0392296 A1 12/2019 Brady et al.
2020/0012962 A1 1/2020 Dent et al.
2020/0034742 A1 1/2020 Dirac et al.
2020/0050612 A1 2/2020 Bhattacharjee et al.
2020/0082010 A1 3/2020 Bodziony et al.
2020/0117434 A1 4/2020 Biskup et al.
2020/0202171 A1 6/2020 Hughes et al.
2020/0226012 A1 7/2020 Pitre et al.
2020/0242508 A1 7/2020 Royo Bonnin et al.
2020/0250525 A1 8/2020 Kumar Addepalli et al.
2020/0272623 A1 8/2020 Aggour et al.
2020/0319877 A1 10/2020 Glazer et al.
2020/0320379 A1 10/2020 Watson et al.
2020/0348662 A1 11/2020 Cella et al.
2020/0349161 A1 11/2020 Siddiqui et al.
2020/0401891 A1 12/2020 Xu et al.
2021/0019665 A1 1/2021 Gur et al.
2021/0081837 A1 3/2021 Polleri et al.
2021/0097343 A1 4/2021 Goodsitt et al.
2021/0157312 A1 5/2021 Cella et al.
2021/0174164 A1 6/2021 Hsieh et al.
2021/0264321 A1 8/2021 Xiang
2021/0286657 A1 9/2021 Mathur et al.
2021/0287133 A1 9/2021 Rudden et al.
2021/0294577 A1 9/2021 Dunn et al.
2021/0304362 A1 9/2021 Palmaro et al.
2021/0334651 A1 10/2021 Leng et al.
2021/0350254 A1 11/2021 Furlanetto et al.
2021/0366577 A1 11/2021 Koller et al.
2021/0390455 A1 12/2021 Schierz et al.
2021/0405984 A1 12/2021 Agarwal et al.
2022/0067181 A1 3/2022 Carley
2022/0076135 A1 * 3/2022 Chen .................... G06N 3/0455
2022/0078264 A1 3/2022 Mathur
2022/0083363 A1 3/2022 Lewis
2022/0086393 A1 3/2022 Peters et al.
2022/0091837 A1 3/2022 Chai et al.
2022/0092043 A1 3/2022 Davidson et al.
2022/0108177 A1 4/2022 Samek et al.
2022/0114451 A1 4/2022 Muñoz et al.
2022/0129581 A1 4/2022 Jones et al.
2022/0129785 A1 4/2022 Vogeti et al.
2022/0138561 A1 5/2022 Prendki
2022/0172040 A1 6/2022 Kazi et al.
2022/0245176 A1 8/2022 Weisman
2022/0269691 A1 8/2022 Liu et al.
2022/0269706 A1 8/2022 Balasubramanian et al.
2022/0292373 A1 9/2022 Khapali et al.
2022/0300850 A1 9/2022 Mendez et al.
2022/0374914 A1 11/2022 Morrill et al.
2022/0407861 A1 12/2022 Beecham et al.
2022/0413821 A1 12/2022 Cmielowski et al.
2023/0111775 A1 4/2023 Lee et al.
2023/0152994 A1 5/2023 Jiang et al.
2023/0161565 A1 5/2023 Montemayor et al.
2023/0186201 A1 6/2023 Cella et al.

(56) References Cited

U.S. PATENT DOCUMENTS

| | | | | |
|---|---|---|---|---|
| 2023/0196230 | A1 | 6/2023 | Cella et al. | |
| 2023/0229412 | A1 | 7/2023 | Paravatha et al. | |
| 2023/0229735 | A1 | 7/2023 | Jain et al. | |
| 2023/0267372 | A1 | 8/2023 | Sujith | |
| 2023/0267373 | A1 | 8/2023 | Ravi | |
| 2023/0315731 | A1 | 10/2023 | Xu et al. | |
| 2023/0325389 | A1 | 10/2023 | Fan et al. | |
| 2023/0378753 | A1 | 11/2023 | Evrenosoglu et al. | |
| 2023/0394361 | A1 | 12/2023 | Chua et al. | |
| 2023/0409756 | A1 | 12/2023 | Baldwin et al. | |
| 2023/0418468 | A1 | 12/2023 | Shah et al. | |
| 2024/0045926 | A1 | 2/2024 | Jati et al. | |
| 2024/0070210 | A1 | 2/2024 | Balasubramanian et al. | |
| 2024/0070304 | A1 | 2/2024 | Sethi et al. | |
| 2024/0078333 | A1 | 3/2024 | Lim et al. | |
| 2024/0104396 | A1 | 3/2024 | Jati et al. | |
| 2024/0134842 | A1 | 4/2024 | Kim et al. | |
| 2024/0248692 | A1 | 7/2024 | Anderson et al. | |
| 2024/0320231 | A1 | 9/2024 | Bhattacharjee et al. | |
| 2025/0037014 | A1* | 1/2025 | Muir | G06N 20/00 |
| 2025/0217114 | A1 | 7/2025 | Roper, Jr. et al. | |
| 2026/0050835 | A1* | 2/2026 | Savvides | G06N 20/00 |
| 2026/0073520 | A1 | 3/2026 | Koller et al. | |

FOREIGN PATENT DOCUMENTS

| | | | |
|---|---|---|---|
| CN | 117255028 | A | 12/2023 |
| WO | 2011/155743 | A2 | 12/2011 |
| WO | 2012/007745 | A2 | 1/2012 |
| WO | 2018/217635 | A1 | 11/2018 |
| WO | 2020/183136 | A1 | 9/2020 |
| WO | 2021/144803 | A1 | 7/2021 |
| WO | 2022/185324 | A1 | 9/2022 |
| WO | 2022/269526 | A1 | 12/2022 |
| WO | 2023/136910 | A1 | 7/2023 |
| WO | 2023/248204 | A1 | 12/2023 |

OTHER PUBLICATIONS

Non-Final Rejection Mailed on Apr. 30, 2025 for U.S. Appl. No. 18/365,494, 11 page(s).

Non-Final Rejection Mailed on Dec. 19, 2024 for U.S. Appl. No. 18/465,576, 7 page(s).

Notice of Allowance and Fees Due (PTOL-85) Mailed on Apr. 14, 2025 for U.S. Appl. No. 18/465,576, 8 page (s).

Notice of Allowance and Fees Due (PTOL-85) Mailed on Dec. 13, 2024 for U.S. Appl. No. 18/242,954, 2 page (s).

Notice of Allowance and Fees Due (PTOL-85) Mailed on Mar. 7, 2025 for U.S. Appl. No. 18/365,485, 8 page (s).

Final Rejection Mailed on Oct. 31, 2024 for U.S. Appl. No. 18/365,485, 10 page(s).

Non-Final Rejection Mailed on May 28, 2024 for U.S. Appl. No. 18/365,485, 9 page(s).

Non-Final Rejection Mailed on Sep. 28, 2024 for U.S. Appl. No. 18/462,846, 12 page(s).

Notice of Allowance and Fees Due (PTOL-85) Mailed on Nov. 5, 2024 for U.S. Appl. No. 18/242,954, 2 page (s).

Notice of Allowance and Fees Due (PTOL-85) Mailed on Oct. 2, 2024 for U.S. Appl. No. 18/242,954, 2 page (s).

Notice of Allowance and Fees Due (PTOL-85) Mailed on Sep. 10, 2024 for U.S. Appl. No. 18/242,954, 14 page (s).

Final Rejection Mailed on Jun. 10, 2025 for U.S. Appl. No. 18/462,846, 11 page(s).

Notice of Allowance and Fees Due (PTOL-85) Mailed on Aug. 19, 2025 for U.S. Appl. No. 18/365,494, 8 page(s).

Anaissi, et al., "A Personalized Federated Learning Algorithm: An Application in Anomaly Detection", (10 pages), Nov. 5, 2021, arXiv:2111.02627v1.

Cai, et al., "The Challenges of Data Quality and Data Quality Assessment in the Big Data Era", Data Science Journal, vol. 14, pp. 1-10, May 15, 2015, DOI: http://dx.doi.org/10.5334/dsj-2015-002.

Cohen, Yoav, "Introducing Universal Masking", satori, (7 pages), Nov. 11, 2020, Retrieved on https://blog.satoricyber.com/introducing-universal-masking/.

Costa, et al., "A Survey on Data-Driven Performance Tuning for Big Data Analytics Platforms", Big Data Research, vol. 25, (17 pages), Jan. 27, 2021.

Debattista, et al., "A Methodology and Framework for Linked Data Quality Assessment", ACM Journal of Data and Information Quality, vol. 4, (29 pages), Jan. 2016, DOI: http://dx.doi.org/10.1145/0000000.0000000.

Devarajan, et al., "Acceleration via Multi-Tiered Data Buffering and Prefetching", Journal of Computer Science and Technology, vol. 35, pp. 92-120, Jan. 2020, DOI: 10.1007/s11390-020-9781-1.

Einziger, et al., "A Highly Efficient Cache Admission Policy", (24 pages), Dec. 3, 2015, arXiv:1512.00727v2.

Fuhl, et al., "Explainable Online Validation of Machine Learning Models for Practical Applications", (9 pages), Jan. 17, 2021, arXiv:2010.00821v3.

Hirano, et al., "RanSAP: An Open Dataset of Ransomware Storage Access Patterns for Training Machine Learning Models", Forensic Science International: Digital Investigation, vol. 40, (22 pages), Dec. 16, 2021, https://www.sciencedirect.com/science/article/pii/S2666281721002390.

Immuta, "Immuta Architecture: Dive Deeper into the Platform", (9 pages), Jan. 3, 2023, Retrieved from https://www.immuta.com/product/architecture/.

Jain et al., "Efficient Execution of Quantized Deep Learning Models: A Compiler Approach", (12 pages), Jun. 18, 2020, arXiv:2006.10226v1.

Janardhanan, PS, "Project Repositories for Machine Learning with TensorFlow", ScienceDirect, vol. 171, pp. 188-196, (2020).

Jin, Lei, "Software-Oriented Distributed Shared Cache Management for Chip Multiprocessors", University of Pittsburgh, (133 pages), 2010, http://d-scholarship.pitt.edu/8834/1/Lei.Jin.08.15.2010.PhD.Thesis.pdf.

Kopp, Andreas, "Practical Federated Learning with Azure Machine Learning", Towards Data Science, (21 pages), Aug. 17, 2022, https://towardsdatascience.com/practical-federated-learning-with-azure-machine-learning-8807f9bd1a7e.

Masolo, Claudio, "Google's BigQuery Introduces Column-Level Encryption Functions and Dynamic Masking of Information", InfoQ, (6 pages), Jul. 7, 2022, Retrieved from https://www.infoq.com/news/2022/07/google-bigquery-encryption/.

Pollok, et al., "Open Fabric for Deep Learning Models", IBM Research, (5 pages), 2018, Retrieved at https://openreview.net/pdf?id=SkgCTFpV2X.

Rivie Res, et al., "Eclipse: A Platform for Integrating Development Tools", IBM Systems Journal, (14 pages), Jan. 2004, DOI: 10.1147/sj.432.0371.

Schwarz, et al., "Augmenting Web Pages and Search Results to Support Credibility Assessment", CHI 2011, (10 pages), May 7, 2011, https://juliaschwarz.net/assets/web-credibility/schwarz-chi11-web-credibility.

Snowflake, "Understanding Dynamic Data Masking", (1 page), Jan. 4, 2023, Retrieved from https://docs.snowflake.com/en/user-guide/security-column-ddm.html.

Vasilache, et al., "Tensor Comprehensions: Framework-Agnostic High-Performance Machine Learning Abstractions", (37 pages), Jun. 29, 2018, arXiv: 1802.04730v3.

Witt, et al., "Predictive Performance Modeling for Distributed Computing Using Black-Box Monitoring and Machine Learning", Elsevier, (19 pages), May 30, 2018, arXiv:1805.11877v1.

Yates, et al., "Age-Optimal Constrained Cache Updating", IEEE International Symposium on Information Theory, (5 pages), 2017.

Non-Final Rejection Mailed on Dec 29, 2025 for U.S. Appl. No. 18/462,846, 12 page(s).

Chen, Andrew, et al., "Developments in MLflow: A System to Accelerate the Machine Learning Lifecycle", In Proceedings of DEEM Fourth International Workshop on Data Management for End-to-End Machine Learning, Jun. 2020, 4 pages, Portland, OR.

Final Rejection Mailed on May 7, 2026 for U.S. Appl. No. 18/462,846, 13 page(s).

(56) References Cited

OTHER PUBLICATIONS

Luu, Hein, "Chapter 9: Managing the Machine Learning Life Cycle", Beginning Apache Spark 3: With DataFrame, Spark SQL, Structured Streaming, and Spark Machine Learning Library, Second Edition, Oct. 2021, pp. 395-429, Apress, US.
Miao, Hui, et al., "Towards Unified Data and Lifecycle Management for Deep Learning", In proceeding of 2017 IEEE 33rd International Conference on Data Engineering (ICDE), Apr. 19-22, 2017, pp. 571-582, San Diego, CA.
Non-Final Rejection Mailed on Apr. 20, 2026 for U.S. Appl. No. 18/483,287, 12 page(s).
Non-Final Rejection Mailed on Jun. 24, 2026 for U.S. Appl. No. 18/483,266, 21 page(s).
Non-Final Rejection Mailed on May 11, 2026 for U.S. Appl. No. 18/358,302, 19 page(s).
Office Action Appendix Mailed on Jun. 24, 2026 for U.S. Appl. No. 18/483,266, 1 page(s).
Office Action Appendix Mailed on Jun. 24, 2026 for U.S. Appl. No. 18/483,266, 3 page(s).
Popp, Matthias, "Comprehensive Support of the Lifecycle of Machine Learning Models in Model Management Systems", Master's Thesis, University of Stuttgart, Institute of Parallel and Distributed Systems, Nov. 4, 2019 (completed), Germany.
Schlegel, Marius, et al., "Management of Machine Learning Lifecycle Artifacts: A Survey", SIGMOD Record, Dec. 2022, pp. 18-35, vol. 51, No. 4, The Association for Computing Machinery (Acm), US.

* cited by examiner

COMPUTE AGNOSTIC MACHINE LEARNING PROJECT WORKSPACES

BACKGROUND

Various embodiments of the present disclosure address technical challenges related to the development, deployment, and management of machine learning models given limitations of existing machine learning project workspaces hosted by specific computing platforms. Conventional machine learning workspaces are hosted within one of many available computing environments that are each specifically tailored to a different stage of model development and maintenance. For instance, a first workspace hosted by a first computing platform, such as Azure Blob Storage and/or the like, may include functionalities tailored to processing datasets for training, evaluating, and validating a model, whereas a second workspace hosted by a second computing platform, such as AWS's Sagemaker Canvas and/or the like, may include functionalities tailored to the actual configuration, training, and validation of the model. Creating a machine learning project by conventional means therefore may require the use of multiple disparate and traditionally incompatible workspaces and/or computing platforms. For any given project, a user may first select an optimal set of third-party computing platforms and then manually configure different workspaces at each of the selected computing platforms. Due to the incompatibility between each of the workspaces and/or computing platforms, tasks performed while developing and/or monitoring a project, such as transferring data to train a model, monitoring the stage of progress and/or use of a model, and/or the like, are all performed by individually accessing each of the workspaces and/or computing platforms. This prevents the centralized aggregation of data across multiple workspaces and/or computing platforms and limits the use of functionalities provided by different computing platforms that may be beneficial for a machine learning project. Various embodiments of the present disclosure make important contributions to various existing machine learning configuration techniques by addressing each of these technical challenges.

BRIEF SUMMARY

Various embodiments of the present disclosure provide a compute agnostic project workspace for leveraging the functionalities across multiple different third-party workspaces from one centralized location. During configuration, a first-party computing resource may automatically generate one or more selected third-party workspaces hosted by various disparate third-party computing resources. During the generation of each third-party workspace, the first-party computing resource may initiate the installation of a first-party routine set with a plurality of callbacks (e.g., webhooks, etc.) within each of the workspaces. The first-party routine set may be configured to establish communication between the compute agnostic project workspace and each of the third-party workspaces. By doing so, the present disclosure provides an improved machine learning project workspace capable of leveraging the functionalities provided by a plurality of different third parties from one centralized location to overcome the technical challenges of conventional machine learning configuration techniques.

In some embodiments, a computer-implemented method performed by a first-party computing resource configured to facilitate a first stage of a machine learning project includes receiving, by one or more processors of the first-party computing resource, a first-party workspace request that is indicative of a third-party computing resource for facilitating a second stage of the machine learning project; and in response to the first-party workspace request generating, by the one or more processors, a compute agnostic project workspace hosted by the first-party computing resource that is configured to access a third-party workspace hosted by the third-party computing resource, initiating, by the one or more processors, the generation of the third-party workspace, and initiating, by the one or more processors, the configuration of a first-party routine set within the third-party workspace, wherein the first-party routine set comprises a plurality of callbacks for facilitating communication between the first-party computing resource and the third-party computing resource.

In some embodiments, a computing system of a first-party computing resource configured to facilitate a first stage of a machine learning project comprising memory and one or more processors communicatively coupled to the memory that are configured to receive a first-party workspace request that is indicative of a third-party computing resource for facilitating a second stage of the machine learning project; and in response to the first-party workspace request generate a compute agnostic project workspace hosted by the first-party computing resource that is configured to access a third-party workspace hosted by the third-party computing resource, initiate the generation of the third-party workspace, and initiate the configuration of a first-party routine set within the third-party workspace, wherein the first-party routine set comprises a plurality of callbacks for facilitating communication between the first-party computing resource and the third-party computing resource.

In some embodiment, one or more non-transitory computer-readable storage media include instructions that, when executed by one or more processors of a first-party computing resource configured to facilitate a first stage of a machine learning project, cause the one or more processors to receive a first-party workspace request that is indicative of a third-party computing resource for facilitating a second stage of the machine learning project; and in response to the first-party workspace request generate a compute agnostic project workspace hosted by the first-party computing resource that is configured to access a third-party workspace hosted by the third-party computing resource, initiate the generation of the third-party workspace, and initiate the configuration of a first-party routine set within the third-party workspace, wherein the first-party routine set comprises a plurality of callbacks for facilitating communication between the first-party computing resource and the third-party computing resource.

DETAILED DESCRIPTION

Figure 1:
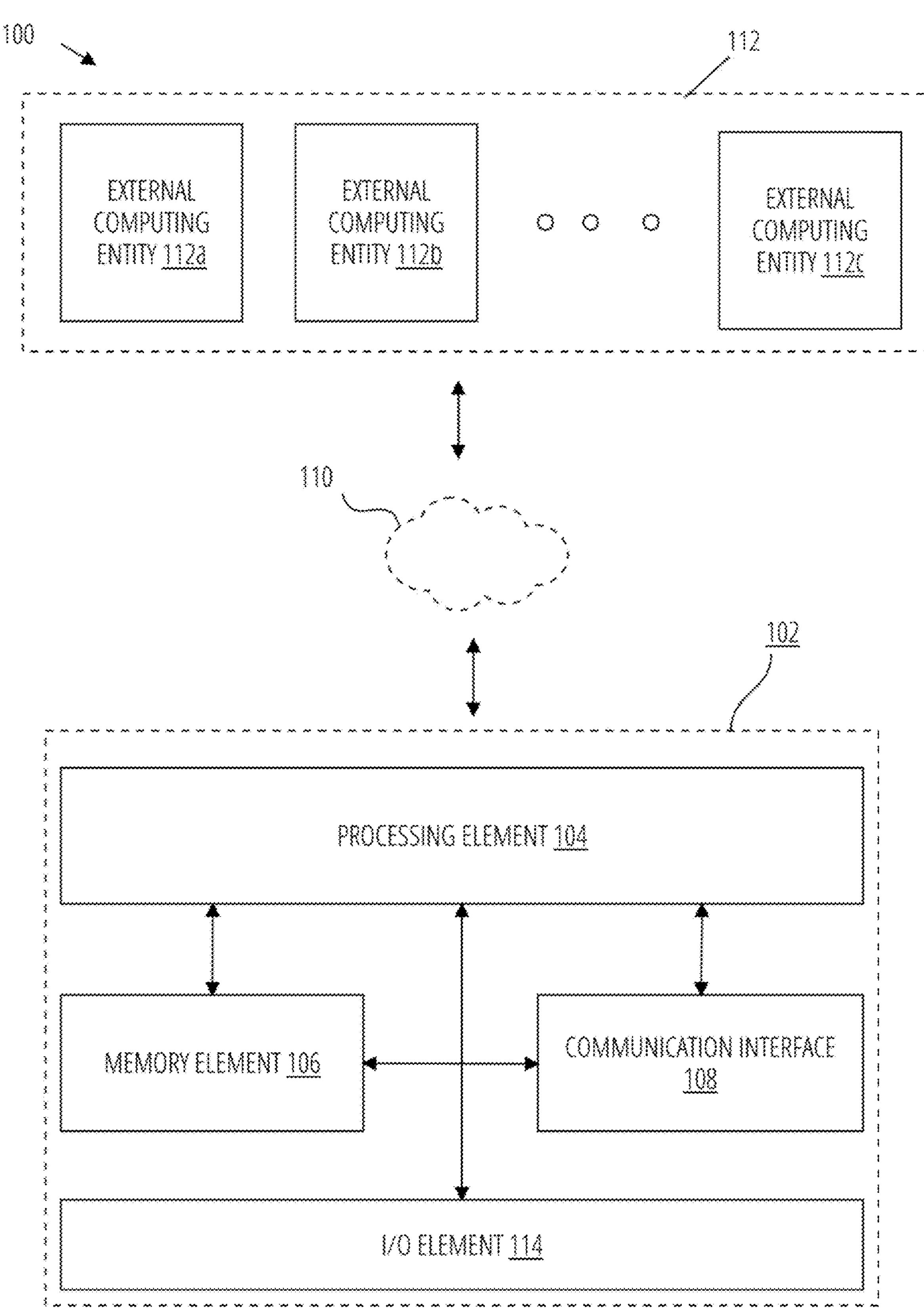
FIG. 1 illustrates an example computing system in accordance with one or more embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that the present disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout.

I. Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically-configured machines performing the steps or operations specified in the block diagrams and flowchart illustrations. Accordingly, the block diagrams and flowchart illustrations support various combinations of embodiments for performing the specified instructions, operations, or steps.

II. Example Framework

FIG. 1 illustrates an example computing system 100 in accordance with one or more embodiments of the present disclosure. The computing system 100 may include a predictive computing entity 102 and/or one or more external computing entities 112*a-c* communicatively coupled to the predictive computing entity 102 using one or more wired and/or wireless communication techniques. The predictive computing entity 102 may be specially configured to perform one or more steps/operations of one or more techniques described herein. In some embodiments, the predictive computing entity 102 may include and/or be in association with one or more mobile device(s), desktop computer(s), laptop (s), server(s), cloud computing platform(s), and/or the like. In some example embodiments, the predictive computing entity 102 may be configured to receive and/or transmit one or more datasets, objects, and/or the like from and/or to the external computing entities 112*a-c* to perform one or more steps/operations of one or more techniques (e.g., configuration techniques, evaluation techniques, development techniques, data management techniques, and/or the like) described herein.

The external computing entities 112*a-c*, for example, may include and/or be associated with one or more third-party computing resources that may be configured to receive, store, manage, and/or facilitate one or more portions of a machine learning based project. The third-party computing resources, for example, may be associated with one or more data repositories, cloud platforms, compute nodes, and/or the like, that may, in some circumstances, be leveraged by the predictive computing entity 102 to facilitate one or more stages of a machine learning based project.

The predictive computing entity 102 may include, or be in communication with, one or more processing elements 104 (also referred to as processors, processing circuitry, digital circuitry, and/or similar terms used herein interchangeably) that communicate with other elements within the predictive computing entity 102 via a bus, for example. As will be understood, the predictive computing entity 102 may be embodied in a number of different ways. The predictive computing entity 102 may be configured for a particular use or configured to execute instructions stored in volatile or non-volatile media or otherwise accessible to the processing element 104. As such, whether configured by hardware or computer program products, or by a combination thereof, the processing element 104 may be capable of performing steps or operations according to embodiments of the present disclosure when configured accordingly.

In one embodiment, the predictive computing entity 102 may further include, or be in communication with, one or more memory elements 106. The memory element 106 may be used to store at least portions of the databases, database instances, database management systems, data, applications, programs, program modules, scripts, source code, object code, byte code, compiled code, interpreted code, machine code, executable instructions, and/or the like being executed by, for example, the processing element 104. Thus, the databases, database instances, database management systems, data, applications, programs, program modules, scripts, source code, object code, byte code, compiled code, interpreted code, machine code, executable instructions, and/or the like may be used to control certain aspects of the operation of the predictive computing entity 102 with the assistance of the processing element 104.

As indicated, in one embodiment, the predictive computing entity 102 may also include one or more communication interfaces 108 for communicating with various computing entities, e.g., external computing entities 112*a-c*, such as by communicating data, content, information, and/or similar terms used herein interchangeably that may be transmitted, received, operated on, processed, displayed, stored, and/or the like.

The computing system 100 may include one or more input/output (I/O) element(s) 114 for communicating with one or more users. An I/O element 114, for example, may include one or more user interfaces for providing and/or receiving information from one or more users of the computing system 100. The I/O element 114 may include one or more tactile interfaces (e.g., keypads, touch screens, etc.), one or more audio interfaces (e.g., microphones, speakers, etc.), visual interfaces (e.g., display devices, etc.), and/or the like. The I/O element 114 may be configured to receive user input through one or more of the user interfaces from a user of the computing system 100 and provide data to a user through the user interfaces.

Figure 2:
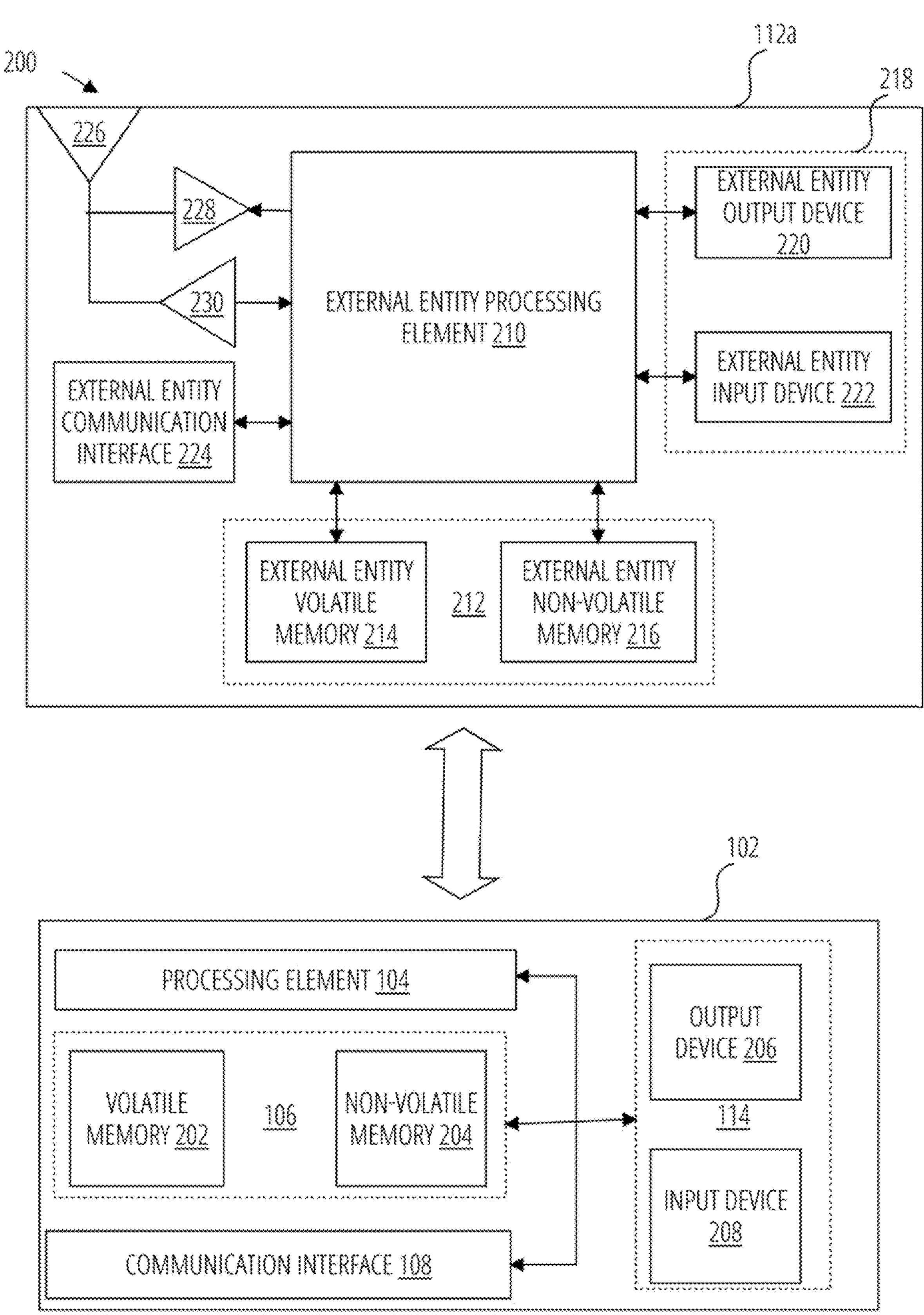
FIG. 2 is a schematic diagram showing a system computing architecture in accordance with some embodiments discussed herein.

FIG. 2 is a schematic diagram showing a system computing architecture 200 in accordance with some embodiments discussed herein. In some embodiments, the system computing architecture 200 may include the predictive computing entity 102 and/or the external computing entity 112*a* of the computing system 100. The predictive computing entity 102 and/or the external computing entity 112*a* may include a computing apparatus, a computing device, and/or any form of computing entity configured to execute instructions stored on a computer-readable storage medium to perform certain steps or operations.

The predictive computing entity 102 may include a processing element 104, a memory element 106, a communication interface 108, and/or one or more I/O elements 114 that communicate within the predictive computing entity 102 via internal communication circuitry, such as a communication bus and/or the like.

The processing element 104 may be embodied as one or more complex programmable logic devices (CPLDs), microprocessors, multi-core processors, coprocessing entities, application-specific instruction-set processors (ASIPs), microcontrollers, and/or controllers. Further, the processing element 104 may be embodied as one or more other processing devices or circuitry including, for example, a processor, one or more processors, various processing devices, and/or the like. The term circuitry may refer to an entirely hardware embodiment or a combination of hardware and computer program products. Thus, the processing element 104 may be embodied as integrated circuits, application specific integrated circuits (ASICs), field programmable gate arrays (FPGAs), programmable logic arrays (PLAs), hardware accelerators, digital circuitry, and/or the like.

The memory element 106 may include volatile memory 202 and/or non-volatile memory 204. The memory element 106, for example, may include volatile memory 202 (also referred to as volatile storage media, memory storage, memory circuitry, and/or similar terms used herein interchangeably). In one embodiment, a volatile memory 202 may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

The memory element 106 may include non-volatile memory 204 (also referred to as non-volatile storage, memory, memory storage, memory circuitry, and/or similar terms used herein interchangeably). In one embodiment, the non-volatile memory 204 may include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In one embodiment, a non-volatile memory 204 may include a floppy disk, flexible disk, hard disk, solid-state storage (SSS) (e.g., a solid-state drive (SSD)), solid state card (SSC), solid state module (SSM), enterprise flash drive, magnetic tape, or any other non-transitory magnetic medium, and/or the like. A non-volatile memory 204 may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile memory 204 may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

As will be recognized, the non-volatile memory 204 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

The memory element 106 may include a non-transitory computer-readable storage medium for implementing one or more aspects of the present disclosure including as a computer-implemented method configured to perform one or more steps/operations described herein. For example, the non-transitory computer-readable storage medium may include instructions that when executed by a computer (e.g., processing element 104), cause the computer to perform one or more steps/operations of the present disclosure. For instance, the memory element 106 may store instructions that, when executed by the processing element 104, configure the predictive computing entity 102 to perform one or more step/operations described herein.

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language, such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established or fixed) or dynamic (e.g., created or modified at the time of execution).

The predictive computing entity 102 may be embodied by a computer program product include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media such as the volatile memory 202 and/or the non-volatile memory 204.

The predictive computing entity 102 may include one or more I/O elements 114. The I/O elements 114 may include one or more output devices 206 and/or one or more input devices 208 for providing and/or receiving information with a user, respectively. The output devices 206 may include one or more sensory output devices, such as one or more tactile output devices (e.g., vibration devices such as direct current motors, and/or the like), one or more visual output devices (e.g., liquid crystal displays, and/or the like), one or more audio output devices (e.g., speakers, and/or the like), and/or the like. The input devices 208 may include one or more sensory input devices, such as one or more tactile input devices (e.g., touch sensitive displays, push buttons, and/or the like), one or more audio input devices (e.g., microphones, and/or the like), and/or the like.

In addition, or alternatively, the predictive computing entity 102 may communicate, via a communication interface 108, with one or more external computing entities such as the external computing entity 112*a*. The communication interface 108 may be compatible with one or more wired and/or wireless communication protocols.

For example, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In addition, or alternatively, the predictive computing entity 102 may be configured to communicate via wireless external communication using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.9 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

The external computing entity 112*a* may include an external entity processing element 210, an external entity memory element 212, an external entity communication interface 224, and/or one or more external entity I/O elements 218 that communicate within the external computing entity 112*a* via internal communication circuitry, such as a communication bus and/or the like.

The external entity processing element 210 may include one or more processing devices, processors, and/or any other device, circuitry, and/or the like described with reference to the processing element 104. The external entity memory element 212 may include one or more memory devices, media, and/or the like described with reference to the memory element 106. The external entity memory element 212, for example, may include at least one external entity volatile memory 214 and/or external entity non-volatile memory 216. The external entity communication interface 224 may include one or more wired and/or wireless communication interfaces as described with reference to communication interface 108.

In some embodiments, the external entity communication interface 224 may be supported by one or more radio circuitry. For instance, the external computing entity 112*a* may include an antenna 226, a transmitter 228 (e.g., radio), and/or a receiver 230 (e.g., radio).

Signals provided to and received from the transmitter 228 and the receiver 230, correspondingly, may include signaling information/data in accordance with air interface standards of applicable wireless systems. In this regard, the external computing entity 112*a* may be capable of operating with one or more air interface standards, communication protocols, modulation types, and access types. More particularly, the external computing entity 112*a* may operate in accordance with any of a number of wireless communication standards and protocols, such as those described above with regard to the predictive computing entity 102.

Via these communication standards and protocols, the external computing entity 112*a* may communicate with various other entities using means such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 112*a* may also download changes, add-ons, and updates, for instance, to its firmware, software (e.g., including executable instructions, applications, program modules), operating system, and/or the like.

According to one embodiment, the external computing entity 112*a* may include location determining embodiments, devices, modules, functionalities, and/or the like. For example, the external computing entity 112*a* may include outdoor positioning embodiments, such as a location module adapted to acquire, for example, latitude, longitude, altitude, geocode, course, direction, heading, speed, universal time (UTC), date, and/or various other information/data. In one embodiment, the location module may acquire data, such as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating a position of the external computing entity 112*a* in connection with a variety of other systems, including cellular towers, Wi-Fi access points, and/or the like. Similarly, the external computing entity 112*a* may include indoor positioning embodiments, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning embodiments may be used in a variety of settings to determine the location of someone or something to within inches or centimeters.

The external entity I/O elements 218 may include one or more external entity output devices 220 and/or one or more external entity input devices 222 that may include one or more sensory devices described herein with reference to the I/O elements 114. In some embodiments, the external entity I/O element 218 may include a user interface (e.g., a display, speaker, and/or the like) and/or a user input interface (e.g., keypad, touch screen, microphone, and/or the like) that may be coupled to the external entity processing element 210.

For example, the user interface may be a user application, browser, and/or similar words used herein interchangeably executing on and/or accessible via the external computing entity 112*a* to interact with and/or cause the display, announcement, and/or the like of information/data to a user. The user input interface may include any of a number of input devices or interfaces allowing the external computing entity 112*a* to receive data including, as examples, a keypad (hard or soft), a touch display, voice/speech interfaces, motion interfaces, and/or any other input device. In embodiments including a keypad, the keypad may include (or cause display of) the conventional numeric (0-9) and related keys (#, *, and/or the like), and other keys used for operating the external computing entity 112*a* and may include a full set of alphabetic keys or set of keys that may be activated to provide a full set of alphanumeric keys. In addition to providing input, the user input interface may be used, for example, to activate or deactivate certain functions, such as screen savers, sleep modes, and/or the like.

III. Examples of Certain Terms

In some embodiments, the term "computing resource" refers to a computing platform configured to facilitate the performance of one or more computing tasks, such as data manipulation, model development, data storage, and/or the like. A computing platform may include one or more processing devices, memory devices, and/or the like that are physically and/or wirelessly coupled and configured to collectively (and/or individually) perform the one or more computing tasks. A computing resource may include an operating system configured to manage and facilitate the use of the one or more processing devices, memory devices, and/or the like. A computing resource may include one or more local and/or remote resources configured to execute computing applications, compute services, and/or the like.

In some embodiments, the term "first-party computing resource" refers to a local computing resource. The local computing resource may include a first-party computing platform with one or more processing devices, memory devices, and/or the like that are owned, operated, and/or otherwise associated with a first-party. The first-party computing resource, for example, may include a software platform that is executed by devices located on the premises of one or more locations associated with the first-party.

In some embodiments, the term "third-party computing resource" refers to a remote computing resource. The remote computing resource may include a third-party computing platform with one or more processing devices, memory devices, and/or the like that are owned, operated, and/or otherwise associated with a third-party. The third-party computing resource, for example, may include a software platform (e.g., Amazon Web Services (AWS), Microsoft Azure, Google Cloud Platform (GCP), etc.) that is executed by a cloud services provider. In some examples, the third-party computing resource may include platform services that may be accessible to a first-party.

In some embodiments, the term "workspace" refers to a unit of computing space and/or processing power that is facilitated by a computing resource. A workspace may include a file, directory, and/or the like that allows a user to store, develop, test, and/or evaluate at least a portion of a machine learning-based project. For example, a workspace may include a portion of digital storage for storing training data, source code files, machine learning parameters and/or weights, and/or the like. As another example, a workspace may include a portion of compute power (e.g., processing power, etc.) for performing one or more computing tasks, and/or the like.

In some examples, a workspace may incorporate one or more functionalities of a host computing resource. For example, a host computing resource may include and/or have access to one or more host routine sets, such as application programming interfaces (APIs), software development kits (SDKs), and/or the like. A workspace hosted by a host computing resource may have access to at least a portion of the host routine sets.

In some embodiments, the term "first-party workspace" refers to a workspace that is hosted by a first-party computing resource. The first-party workspace may include a local file, directory, and/or the like that is hosted by one or more local computing resources of the first-party. The first-party workspace may be configured based on an operating system of the first-party computing resource and may offer access to a plurality first-party routine sets (e.g., application programming interfaces (APIs), software development kits (SDKs), etc.) configured for the first-party computing resource.

In some embodiments, the term "third-party workspace" refers to a workspace that is hosted by a third-party computing resource. The third-party workspace may include a remote file, directory, and/or the like that is hosted by one or more third-party computing resources of a third-party. The third-party workspace may be configured based on an operating system of the third-party computing resource and may offer access to a plurality of third-party routine sets (e.g., APIs, SDKs, etc.) configured for the third-party computing resource.

In some embodiments, the term "compute agnostic project workspace" refers to workspace that is at least partially hosted by a first-party computing resource and/or at least one third-party computing resource. The compute agnostic project workspace may support multiple compute choices for a machine learning project including on-prem, first-party, solutions and third-party solutions, such as cloud service platforms (e.g., Kubernetes, Spark, AML, Sagemaker, Databricks, etc.). For example, the compute agnostic project workspace may aggregate data and functionality across a plurality of first-party and/or third-party workspaces to allow users (e.g., data scientists, etc.) to take advantage of different compute choices for handling different stages, workloads, and/or the like of a machine learning project from one centralized workspace, while working with consistent contracts for data access, analysis, model building, deployment, and/or the like.

In some examples, the compute agnostic project workspace may be hosted by the first-party computing resource. The compute agnostic project workspace may include cloud agnostic routine sets, such as APIs, SDKs, and/or the like, that communicatively couple the compute agnostic project workspace to each of a plurality of third-party workspaces identified for a machine learning project. In this way, the compute agnostic project workspace may provide access to novelty features available through different third-party computing resources (e.g., cloud providers, etc.) and mix and match the third-party computing resources based on the requirements of a machine learning project. By way of example, the compute agnostic project workspace may provide access to a first third-party workspace (e.g., an AWS Sagemaker Canvas, etc.) to leverage specific functionality for training a machine learning model and a second third-party workspace (e.g., Azure Blob Storage, etc.) to leverage a different set of functionality for storing training data.

In some embodiments, the term "sub-workspace" refers to a section of a workspace. For example, a workspace, such as a compute agnostic project workspace, may include a plurality of sections defined by a machine learning project workflow. The workspace may include a sub-workspace for each section of the machine learning project workflow. By way of example, a machine learning project workflow may include a configuration stage, a data preparation stage, a model experiment stage, a model review stage, a model deployment stage, and/or the like. A workspace may include a first sub-workspace that corresponds to the configuration stage, a second sub-workspace that corresponds to the data preparation stage, a third sub-workspace that corresponds to the model experiment stage, a fourth sub-workspace that corresponds to the model review stage, a fifth sub-workspace that corresponds to the model deployment stage, and/or the like. In some examples, each sub-workspace may be associated with one or more third-party workspaces.

In some embodiments, the term "first-party workspace request" refers to a data entity that represents a user intention for configuring a first-party workspace at a first-party computing resource. In some examples, the first-party workspace request may include a request to configure a compute agnostic project workspace. The first-party workspace request may include configuration data that identifies one or more project attributes, one or more third-party computing resources, one or more user subscriptions, and/or any other data associated with a first-party computing resource, a third-party computing resource, and/or a machine learning project.

In some embodiments, the first-party workspace request identifies a third-party computing resource for one or more stages of a machine learning project. By way of example, a machine learning project may include a data preparation stage, a model experiment stage, a model review stage, and/or model deployment stage for a machine learning model. The first-party workspace request may identify a first third-party computing resource for a data preparation stage and/or a second third-party computing resource for a model experiment stage. The first third-party computing resource, for example, may include a first set of functionality that may be leveraged to prepare a training dataset for a machine learning model, whereas the second third-party computing resource may include a second set functionality that may be leveraged to optimize a machine learning model over a prepared training dataset.

In some embodiments, the term "machine learning project" refers to a data entity that represents one or more machine learning models that are configured to perform a machine learning task and/or one or more datasets used to generate, evaluate, and/or refine the machine learning models. By way of example, the machine learning project may include one or more model architectures, parameters, and/or weights that may be configured to generate one or more trained machine learning models. In addition, or alternatively, the machine learning project may include one or more training, testing, and/or validation datasets for generating the one or more trained machine learning models.

In some embodiments, the term "machine learning model" refers to a data entity that describes parameters, hyper-parameters, and/or defined operations of a rules-based algorithm, machine learning model (e.g., model including at least one of one or more rule-based layers, one or more layers that depend on trained parameters, coefficients, and/or the like), and/or the like. The machine learning model may be configured to process input data to generate a prediction, classification, and/or any other machine learning output. The machine learning model may include one or more of any type of machine learning model including one or more supervised, unsupervised, semi-supervised, reinforcement learning models, and/or the like. In some embodiments, the machine learning model may include multiple models configured to perform one or more different stages of the joint machine learning process. The machine learning model may include one or more neural networks, deep learning models (e.g., long short term memory networks, recurrent neural networks, etc.), regression models, random forest models, support vector machines, and/or the like.

In some embodiments, the term "first-party routine set" refers to a data entity that represents one or more computing functionalities corresponding to a first-party. For example, the first-party routine set may include a first-party API that defines one or more interface calls between a first-party workspace and a first-party server. In some examples, the first-party routine set may include a first-party SDK that provides one or more development tools and/or functionalities for the configuration of a machine learning project.

In some embodiments, the term "third-party routine set" refers to a data entity that represent one or more computing functionalities corresponding to a third-party computing resource. For example, the third-party routine set may include a third-party API that defines one or more interface calls between a third-party workspace and a third-party server. In some examples, the third-party routine set may include a third-party SDK that provides one or more development tools and/or functionalities for the configuration of a machine learning project.

In some embodiments, the term "publication request routine" refers to a data entity that represents a particular computing functionality implemented by the first-party routine set. The publication request routine may initiate the transfer of data from a third-party workspace to the compute agnostic project workspace and/or another memory location of the first-party computing resource. By way of example, the publication request routine may trigger a webhook (e.g., a programmable intermediary, etc.) of a first-party routine set installed within a third-party workspace to relay data from the third-party workspace to the compute agnostic project workspace.

In some embodiments, the term "project quality routine" refers to a data entity that represents a particular computing functionality implemented by a first-party routine set. Project quality routines may include one or more verification functions for verifying one or more aspects of a machine learning project. By way of example, the project quality routines may include one or more scanning functions for verifying the completeness of a project, one or more compiling functions for verifying the executability of the project, one or more data evaluation functions for verifying the data quality for a project, one or more model evaluation functions for verifying the model performance for a project, and/or the like. In some examples, the project quality routines may be included within a first-party routine set installed within a third-party workspace to allow a first-party computing resource to check project quality at the third-party workspace. By way of example, a call to a publication request routine may initiate the performance of the project quality routines within a third-party workspace to generate evaluation data for the machine learning project. In some examples, the publication request routine may be configured to relay data from the third-party workspace based on the evaluation data.

In some embodiments, the term "evaluation data" refers to a data entity that represents one or more evaluated aspects of a machine learning project. The evaluation data may include a plurality of project quality metrics generated by the project quality routines. The project quality metrics may include one or more data quality metrics, such as data fairness, completeness, and/or the like, one or more model quality metrics, such as model fairness, overall performance, and/or the like, and/or any other metrics for evaluating a machine learning project.

In some embodiments, the term "publication criteria" refers to a data entity that represents one or more first-party requirements for receiving and/or providing data from a third-party workspace. The publication criteria may include one or more project quality thresholds for determining whether to accept data from a third-party workspace. The project quality thresholds, for example, may include one or more threshold requirements that are tailored to each of the project quality metrics generated for a machine learning project. For example, the project quality thresholds may include a data quality threshold for evaluating a data quality metric for a machine learning project. As another example, the project quality thresholds may include a model quality threshold for evaluating a model quality metric for a machine learning project.

In some embodiments, the publication criteria establishes one or more different sets of first-party requirements for publishing portions of a machine learning project to different privilege levels of the first-party. By way of example, the publication criteria may include a first set of project quality thresholds for publishing data from a third-party workspace to the compute agnostic project workspace. In addition, or alternatively, the publication criteria may include a second set of project quality thresholds for publishing data from a third-party workspace to a unified project repository. The second set of project quality thresholds may be stricter than the first set of project quality thresholds.

In some embodiments, the term "canonical representation" refers to a data entity that represents a standardized representation of a machine learning project. The canonical representation may include a plurality of model attributes that describe one or more aspects of the machine learning project. For example, the canonical representation may include evaluation data for the machine learning project. In addition, or alternatively, the canonical representation may include interfaces (e.g., interactive links, pointer, API endpoints, etc.) for accessing the machine learning model and/or workspace for a portion of the machine learning model (e.g., hosted by a first-party and/or third-party resource, etc.).

In some embodiments, the term "configuration interface" refers to a user interface for facilitating a first-party workspace request. The configuration interface may be hosted by a first-party computing resource to facilitate the input of one or more configuration parameters for a compute agnostic project workspace. For instance, a configuration interface may include one or more selection interfaces that respectively include one or more selection widgets for providing a selection input indicative of a configuration parameter for the compute agnostic project workspace. By way of example, a first selection interface may include one or more interactive compute selection widgets indicative of a first plurality of third-party computing resources for model configuration. As another example, a second selection interface may include one or more interactive data selection widgets indicative of a second plurality of third-party computing resources for data configuration.

In some embodiments, the term "user subscription" refers to a data entity that describes one or more third-party privileges for a user. A user subscription may identify one or more third-party credentials, third-party allowances (e.g., space, processing power, etc.), and/or the like, that may be leveraged by the first-party computing resource to generate a third-party workspace for a user and/or group of users. By way of example, the user subscription may include one or more cloud computing privileges for allocating space, computing power, and/or the like from a third-party computing resource to a machine learning project.

IV. Overview

Embodiments of the present disclosure present machine learning configuration techniques that provide improvements over traditional machine learning environments that are restricted to a single computing platform. The machine learning configuration techniques may be leveraged to generate a compute agnostic project workspace for developing, managing, and deploying a machine learning project. Unlike conventional machine learning environments, the compute agnostic project workspace may leverage the functionalities provided by multiple disparate computing platforms from one centralized location. To do so, some embodiments of the present disclosure describe initiating the generation of a third-party workspace by a first-party computing resource and, during the configuration of the third-party workspace, installing a first-party routine set (e.g., software development kit (SDK), etc.) to automatically link the third-party workspace to a compute agnostic project workspace.

During the development, management, and deployment of a machine learning project, the first-party routine set may allow a user to initiate commands to and aggregate data from each of a plurality of linked third-party workspaces. In this way, some embodiments of the present disclosure provide cloud agnostic workspace where users may work with their choice of cloud provider or on-prem solution to access and store data, while bringing functionalities provided by other providers to the data instead of moving data to multiple different cloud environments. This may allow one, first-party platform, to serve as a default framework for leveraging each of the unique functionalities provided by different machine learning development, management, and deployment solutions. The first-party platform may provide an end-to-end machine learning project platform with bring your own compute that overcomes the compatibility disadvantages unique to computer technology. By doing so, embodiments of the present disclosure prevent project fragmentation by facilitating the seamless integration of multiple disparate, incompatible, computing functionalities from one centralized environment. Other technical improvements and advantages may be realized by one of ordinary skill in the art.

V. Example System Operations

As indicated, various embodiments of the present disclosure make important technical contributions to machine learning configuration techniques for developing, managing, and deploying machine learning models. In particular, systems and methods are disclosed herein that implement configuration techniques for seamlessly leveraging multiple, traditionally incompatible, functionalities from across different third-party computing resources.

Figure 3:
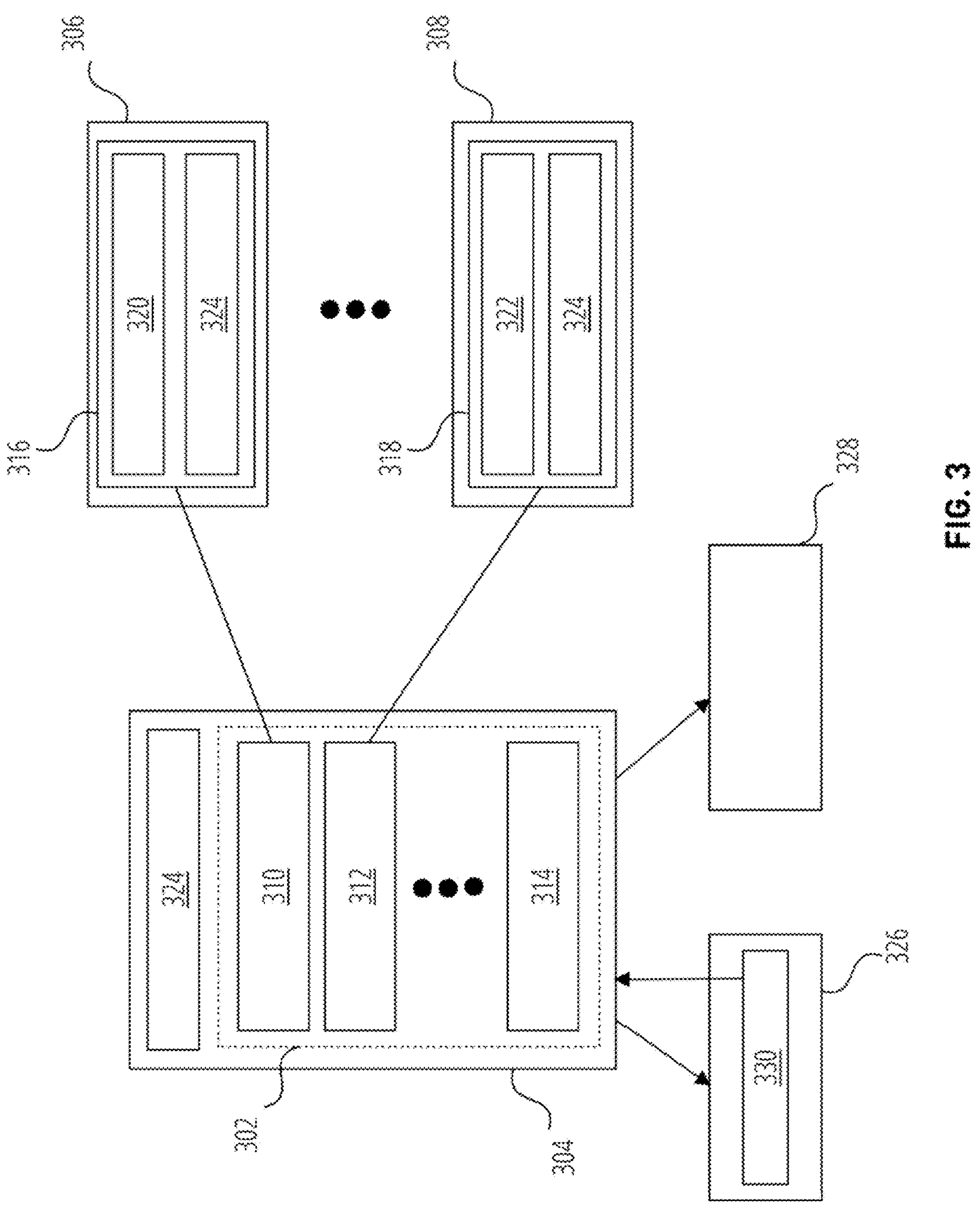
FIG. 3 is a dataflow diagram showing example data structures for facilitating a compute agnostic project workspace in accordance with some embodiments discussed herein.

FIG. 3 is a dataflow diagram 300 showing example data structures for facilitating a compute agnostic project workspace in accordance with some embodiments discussed herein. The dataflow diagram 300 depicts a set of data structures and computing entities for generating a centralized workspace for leveraging various machine learning development, evaluation, and validation functionalities across a plurality of disparate computing resources. The centralized workspace may be a compute agnostic project workspace 302 that is provided by a first-party computing resource 304. The first-party computing resource 304 may facilitate access to a plurality of different machine learning tools offered by third-party computing resources to provide a cloud agnostic end-to-end machine learning environment where users may work with any of a plurality of different combinations of third-party computing resources, such as the first third-party computing resource 306 and/or the second third-party computing resource 308. In some examples, the first third-party computing resource 306 and the second third-party computing resource 308 may be different third-party computing resources.

In some embodiments, a computing resource is a computing platform configured to facilitate the performance of one or more computing tasks, such as data manipulation, model development, data storage, and/or the like. A computing platform may include one or more processing devices, memory devices, and/or the like that are physically and/or wirelessly coupled and configured to collectively (and/or individually) perform the one or more computing tasks. A computing resource may include an operating system configured to manage and facilitate the use of the one or more processing devices, memory devices, and/or the like. A computing resource may include one or more local and/or remote resources configured to execute computing applications, compute services, and/or the like.

In some embodiments, the first-party computing resource 304 is a local computing resource. The local computing resource may include a first-party computing platform with one or more processing devices, memory devices, and/or the like that are owned, operated, and/or otherwise associated with a first-party. The first-party computing resource, for example, may include a software platform that is executed by devices located on the premises (e.g., on-prem devices) of one or more locations associated with the first-party.

In some embodiments, a third-party computing resource, such as the first third-party computing resource 306 and/or the second third-party computing resource 308, is a remote computing resource. The remote computing resource may include a third-party computing platform with one or more processing devices, memory devices, and/or the like that are owned, operated, and/or otherwise associated with a third-party. The third-party computing resource, for example, may include a software platform (e.g., Amazon Web Services (AWS), Microsoft Azure, Google Cloud Platform (GCP), etc.) that is executed by a cloud services provider. In some examples, the third-party computing resource may include platform services that may be accessible to a first-party. As an example, the first third-party computing resource 306 may be a first software platform and the second third-party computing resource 308 may be a second software platform.

Each of the first-party computing resource 304, the first third-party computing resource 306, and the second third-party computing resource 308 may be configured to operate according to different computing architectures, operating systems, APIs, and/or the like. Each computing resource, for example, may be a distinct computing node that may be configured to operate in a manner that may be incompatible with the one or more other computing resources. Traditionally, machine learning platforms address compatibility issues by constraining the compute choices for a machine learning project. However, this may lead to fragmentation and increases in cognitive overload. To address these concerns, some of the embodiments of the present disclosure facilitate a compute agnostic project workspace 302 that enables a user to leverage the functionalities of multiple, potentially incompatible, computing platforms from one centralized project workspace.

In some embodiments, a workspace is a unit of computing space and/or processing power that is facilitated by a computing resource. A workspace may include a file, directory, graphical user interface (GUI), and/or the like that allows a user to store, develop, test, and/or evaluate at least a portion of a machine learning-based project. For example, a workspace may include a portion of digital storage for storing training data, source code files, machine learning parameters and/or weights, configuring machine learning models, and/or the like. As another example, a workspace may include a portion of compute power (e.g., processing power, etc.) for performing one or more computing tasks, and/or the like.

In some examples, a workspace may incorporate one or more functionalities of a host computing resource. For example, a host computing resource may include and/or have access to one or more host routine sets, such as application programming interfaces (APIs), software development kits (SDKs), and/or the like. A workspace hosted by a host computing resource may have access to at least a portion of the host routine sets. By way of example, the host computing resource for a workspace may include the first-party computing resource 304, the first third-party computing resource 306, and/or the second third-party computing resource 308.

In some embodiments, a first-party workspace is a workspace that is hosted by the first-party computing resource 304. The first-party workspace may include a local file, directory, GUI, and/or the like that is hosted by one or more local computing resources of a first-party. The first-party workspace may be configured based on an operating system of the first-party computing resource and may offer access to a plurality of first-party routine sets 324 configured for the first-party computing resource.

In some embodiments, a third-party workspace, such as the first third-party workspace 316, the second third-party workspace 318, and/or the like, is to a workspace that is hosted by a respective third-party computing resource. For example, the first third-party workspace 316 may be hosted by the first third-party computing resource 306, the second third-party workspace 318, may be hosted by the second third-party computing resource 308, and/or the like. A third-party workspace may include a remote file, directory, GUI, and/or the like that is hosted by the respective third-party computing resources. The first third-party workspace 316 may be configured based on an operating system of the first third-party computing resource 306 and may offer access to a plurality of first third-party routine sets 320 (e.g., APIs, SDKs, etc.) configured for the first third-party computing resource 306. The second third-party workspace 318 may be configured based on an operating system of the second third-party computing resource 308 and may offer access to a plurality of second third-party routine set 322 (e.g., APIs, SDKs, etc.) configured for the second third-party computing resource 308.

In some embodiments, the first-party computing resource 304 is configured to generate a compute agnostic project workspace 302 to leverage the various functionalities provided by one or more third-party computing resources. The compute agnostic project workspace 302 may provide an interface between the first-party computing resource 304 and the third-party computing resources to facilitate the use of a plurality of different routine sets, such as the first-party routine set 324, the first third-party routine set 320, the second third-party routine set 322, and/or the like from one central workspace.

In some embodiments, the compute agnostic project workspace is a workspace that is at least partially hosted by the first-party computing resource 304 and/or at least one third-party computing resource. The compute agnostic project workspace 302 may support multiple compute choices for a machine learning project including on-prem, first-party, solutions and third-party solutions, such as cloud server platforms (e.g., Kubernetes, Spark, AML, Sagemaker, Databricks, etc.). For example, the compute agnostic project workspace 302 may aggregate data and functionality across a plurality of first-party and/or third-party workspaces to allow users (e.g., data scientists, etc.) to take advantage of different compute choices for handling different stages, workloads, and/or the like of a machine learning project from one centralized workspace, while working with consistent contracts for data access, analysis, model building, deployment, and/or the like.

In some examples, the compute agnostic project workspace 302 may be hosted by the first-party computing resource 304. The compute agnostic project workspace 302 may include cloud agnostic routine sets, such as APIs, SDKs, and/or the like, that communicatively couple the compute agnostic project workspace 302 to each of a plurality of third-party workspaces identified for a machine learning project. In this way, the compute agnostic project workspace 302 may provide access to novelty features available through different third-party computing resources (e.g., cloud providers, etc.) and mix and match the first third-party computing resources 306 based on the requirements of a machine learning project. By way of example, the compute agnostic project workspace 302 may provide access to a first third-party workspace 316 (e.g., an AWS Sagemaker Canvas, etc.) to leverage specific functionality (e.g., first third-party routine set 320, etc.) for training a machine learning model and a second third-party workspace 318 (e.g., Azure Blob Storage, etc.) to leverage a different set of functionality (e.g., second third-party routine set 322) for storing training data.

The compute agnostic project workspace 302 may be generated based on configuration data. For example, the first-party computing resource 304 may be configured to generate the compute agnostic project workspace 302 in response to a first-party workspace request 330 that includes configuration data for the compute agnostic project workspace 302.

In some embodiments, the first-party workspace request 330 refers to a data entity that represents a user intention for configuring a first-party workspace at the first-party computing resource 304. In some examples, the first-party workspace request 330 may include a request to configure the compute agnostic project workspace 302. The first-party workspace request 330 may include configuration data that identifies one or more project attributes, one or more third-party computing resources, one or more user subscriptions, and/or any other data associated with a first-party computing resource 304, a third-party computing resource, and/or a machine learning project.

In some embodiments, the first-party workspace request 330 identifies a third-party computing resource for one or more stages of a machine learning project. By way of example, a machine learning project may include a data preparation stage, a model experiment stage, a model review stage, and/or model deployment stage for a machine learning model. The first-party workspace request 330 may identify a first third-party computing resource 306 for a data preparation stage, a second third-party computing resource 308 for a model experiment stage, and/or the like. The first third-party computing resource 306, for example, may include a first set of functionality (e.g., first third-party routine set 320, etc.) that may be leveraged to prepare a training dataset for a machine learning model, whereas the second third-party computing resource 308 may include a second set functionality (e.g., second third-party routine set 322) that may be leveraged to optimize a machine learning model over a prepared training dataset.

In some embodiments, a machine learning project is a data entity that represents one or more machine learning models that are configured to perform a machine learning task and/or one or more datasets used to generate, evaluate, and/or refine the machine learning models. By way of example, the machine learning project may include one or more model architectures, parameters, and/or weights that may be configured to generate one or more trained machine learning models. In addition, or alternatively, the machine learning project may include one or more training, testing, and/or validation datasets for generating the one or more trained machine learning models.

In some embodiments, a machine learning model is a data entity that describes parameters, hyper-parameters, and/or defined operations of a rules-based algorithm, machine learning model (e.g., model including at least one of one or more rule-based layers, one or more layers that depend on trained parameters, coefficients, and/or the like), and/or the like. The machine learning model may be configured to process input data to generate a prediction, classification, and/or any other machine learning output. The machine learning model may include one or more of any type of machine learning model including one or more supervised, unsupervised, semi-supervised, reinforcement learning models, and/or the like. In some embodiments, the machine learning model may include multiple models configured to perform one or more different stages of a joint machine learning process. The machine learning model may include one or more neural networks, deep learning models (e.g., long short term memory networks, recurrent neural networks, etc.), regression models, random forest models, support vector machines, and/or the like.

In some embodiments, the first-party computing resource 304 receives a first-party workspace request 330 for a machine learning project that involves one or more machine learning models. The first-party computing resource 304 may receive the first-party workspace request 330 from a user, computing entity, and/or the like. The first-party workspace request 330 may be indicative of (e.g., include a workspace identifier of) a third-party computing resource, such as the first third-party computing resource 306 and/or the second third-party computing resource 308.

In some embodiments, the first-party workspace request 330 is received from a user through a configuration interface 326 provided by the first-party computing resource 304. For example, the configuration interface 326 may include one or more selection interfaces. The first-party workspace request 330 may include selection input, from one or more of the selection interfaces, that identifies one or more portions of the configuration data for a compute agnostic project workspace 302.

In some embodiments, a configuration interface 326 is a user interface for facilitating a first-party workspace request 330. The configuration interface 326 may be hosted by the first-party computing resource 304 to facilitate the input of one or more configuration parameters for the compute agnostic project workspace 302. For instance, the configuration interface 326 may include one or more selection interfaces that respectively include one or more selection widgets for providing a selection input indicative of (e.g., including an identifier of) a configuration parameter for the compute agnostic project workspace 302. By way of example, a first selection interface may include one or more interactive compute selection widgets indicative of (e.g., including an identifier of) a first plurality of third-party computing resources for model configuration. As another example, a second selection interface may include one or more interactive data selection widgets indicative of (e.g., including an identifier of) a second plurality of third-party computing resources for data configuration.

In some examples, the first-party computing resource 304 may receive a first selection input from a first selection interface of the configuration interface 326 hosted by the first-party computing resource 304. The first selection input may identify the first third-party computing resource 306 for configuring a machine learning model. The first third-party computing resource 306, for example, may be selected for training one or more machine learning models of the machine learning project. In some examples, the first-party computing resource 304 may receive a second selection input from a second selection interface of the configuration interface 326 hosted by the first-party computing resource 304. The second selection input may identify the second third-party computing resource 308 for configuring a training dataset for a machine learning model. The second third-party computing resource 308, for example, may be selected for processing a dataset for training one or more machine learning models of the machine learning project.

In some embodiments, the first-party computing resource 304 may provide the first selection interface and/or the second selection interface for display to a user. The first selection interface may include one or more interactive compute selection widgets that identify a plurality of available third-party computing resources for model configuration. The second selection interface may include one or more interactive data selection widgets that identify a plurality of available third-party computing resources for data configuration. In some examples, the plurality of available third-party computing resources may be dynamically determined based on one or more attributes of the machine learning project and/or a user subscription associated with the user.

In response to the first-party workspace request for a machine learning project, the first-party computing resource 304 may generate the compute agnostic project workspace 302 hosted by the first-party computing resource 304, initiate the generation of a third-party workspace hosted by one or more third-party computing resources based on the configuration data, and/or initiate a configuration of a first-party routine set within the third-party workspace. By way of example, the first-party computing resource 304 may initiate the generation of at least one third-party workspace for each third-party computing resource identified by the configuration data.

In some examples, the first-party workspace request may be indicative of (e.g., include an identifier of) a plurality of third-party computing resources. The first-party computing resource 304 may initiate the generation of a respective third-party workspace for each of the plurality of third-party computing resources. For instance, the configuration data may identify the first third-party computing resource 306 and the second third-party computing resource 308. In such a case, the first-party computing resource 304 may initiate the generation of the first third-party workspace 316 and the second third-party workspace 318.

In some embodiments, the first-party workspace request is associated with one or more user subscriptions. The one or more user subscriptions may be indicative of (e.g., include an identifier of) one or more resource permissions for a third-party computing resource. The one or more resource permissions, for example, may be indicative of (e.g., include an identifier of) an amount of allocated space for a user, an amount of allocated compute power for the user, and/or the like. In some examples, a third-party workspace may be generated using one or more user subscriptions for the third-party workspace.

In some embodiments, the user subscription is a data entity that describes one or more third-party privileges for a user. A user subscription may identify one or more third-party credentials, third-party allowances (e.g., space, processing power, etc.), and/or the like, that may be leveraged by the first-party computing resource 304 to generate a third-party workspace for a user and/or group of users. By way of example, the user subscription may include one or more cloud computing privileges for allocating space, computing power, and/or the like from a third-party computing resource to a machine learning project.

In some embodiments, the first-party computing resource 304 leverages the one or more user subscriptions to initiate the generation of a third-party workspace at a third-party computing resource. For example, the first-party computing resource 304 may leverage user subscriptions for a first third-party computing resource 306 to initiate the generation of the first third-party workspace 316. As another example, the first-party computing resource 304 may leverage user subscriptions for the second third-party computing resource 308 to initiate the generation of the second third-party workspace 318.

The user subscriptions, for example, may be leveraged to configure the connectivity, network security, and/or infrastructure parameters for the third-party workspace. The user subscriptions may correspond to a user and/or a group of users associated with a first-party workspace request 330. In some examples, a user and/or a user group may be associated with a profile with the first-party that may identify the user subscriptions. In some examples, the profile may be at least partially controlled by the first-party to enable one or more different user subscriptions for the user and/or user group. In this manner, the first-party may authorize the use and/or the extent of use of the third-party computing resources.

In some embodiments, the first-party computing resource 304 initiates the configuration of the first-party routine set 324 within each of the third-party workspaces. For example, the first-party computing resource 304 may initiate a configuration of the first-party routine set 324 within the respective third-party workspace for each of the plurality of third-party computing resources to facilitate communication between the first-party computing resource 304 and each of the plurality of third-party computing resources.

In some embodiments, the first-party routine set 324 is a data entity that represents one or more computing functionalities corresponding to a first-party. For example, the first-party routine set 324 may include a first-party API that defines one or more interface calls between a first-party workspace and a first-party server. In some examples, the first-party routine set 324 may include a first-party SDK that provides one or more development tools and/or functionalities for the configuration of a machine learning project.

In some examples, the first-party routine set 324 may define a plurality of callbacks (e.g., webhooks, etc.) for facilitating communication between the first-party computing resource 304 and the third-party computing resources. The plurality of callbacks, for example, may include webhooks and/or other callback functions that automatically initiate the transfer of data between the first-party computing resource 304 and the third-party computing resources. The callback functions may be event-driven. For example, the callbacks may initiate the transfer of data between the first-party computing resource 304 and the third-party computing resources in response to one or more changes within a respective third-party workspace, such as a coding modification, a parameter or weighting modification, a dataset modification, and/or the like. In some examples, the callbacks are triggered by one or more other functions of the first-party routine set 324, such as a publication request routine, and/or the like.

During configuration, the first-party computing resource 304 may automatically install the first-party routine set 324 within a third-party workspace to initiate the transfer of data from the third-party workspace to the compute agnostic project workspace 302. In this manner, the compute agnostic project workspace 302 may aggregate data across a plurality of different workspaces hosted by various different third-party computing resources.

In some embodiments, the compute agnostic project workspace 302 includes a plurality of sub-workspaces that are tailored to one or more different stages of a machine learning project. In some examples, each sub-workspace may be configured to aggregate data from one or more different third-party computing resources to facilitate a particular stage of the machine learning project. For example, a sub-workspace may be configured for a stage of the machine learning project handled by the first-party and/or a stage of the machine learning project handled by a third-party. A first sub-workspace 310, for instance, may be configured for a first stage (e.g., data preparation stage, etc.) of the machine learning project handled by the first third-party computing resource 306 through the first third-party workspace 316. A second sub-workspace 312 may be configured for a second stage (e.g., model experiment stage, etc.) of the machine learning project handled by the second third-party computing resource 308 through the second third-party workspace 318. A third sub-workspace 314 may be configured for a third stage (e.g., a model review stage, etc.) handled by the first-party computing resource 304 through a first-party workspace.

In some embodiments, a sub-workspace is a section of a workspace. For example, a workspace, such as the compute agnostic project workspace 302, may include a plurality of sections defined by a machine learning project workflow. The workspace may include a sub-workspace for each section of the machine learning project workflow. By way of example, a machine learning project workflow may include a configuration stage, a data preparation stage, a model experiment stage, a model review stage, a model deployment stage, and/or the like. A workspace may include the first sub-workspace 310 that corresponds to the data preparation stage, the second sub-workspace 312 that corresponds to the model experiment stage, a third sub-workspace 314 that corresponds to the model review stage, a fourth sub-workspace that corresponds to the model deployment stage, and/or the like.

In some embodiments, a sub-workspace corresponds with a third-party workspace. As an example, the first sub-workspace 310 may correspond to the first third-party workspace 316 and the second sub-workspace 312 may correspond to the second third-party workspace 318. Using the first-party routine set 324 (e.g., one or more callbacks thereof), each sub-workspace may aggregate data from and/or initiate commands to a corresponding third-party workspace that is hosted by a third-party computing resource. The aggregated data and/or initiated commands may be provided to/from a user through the compute agnostic project workspace 302 to provide a holistic view and/or control over a machine learning project that is developed, managed, and/or refined across a plurality of disparate third-party computing resources.

In some embodiments, each third-party workspace has access to particular third-party routine sets provided by a respective third-party computing resource. For example, the first third-party workspace 316 may have access to one or more first third-party routine sets 320 that are provided and/or compatible within the first third-party workspace 316. The first third-party routine set 320 may be leveraged within the first third-party workspace 316 to configure at least a portion of a machine learning project (e.g., a data preparation stage, etc.). As another example, the second third-party workspace 318 may have access to one or more second third-party routine sets 322 that are provided and/or compatible within the second third-party workspace 318. The second third-party routine set 322 may be leveraged within the second third-party workspace 318 to configure at least a portion of the machine learning project.

In some embodiments, the third-party routine set is a data entity that represents one or more computing functionalities corresponding to a third-party computing resource. For example, the third-party routine set may include a third-party API that defines one or more interface calls between a third-party workspace and a third-party server. In some examples, the third-party routine set may include a third-party SDK that provides one or more development tools and/or functionalities for the configuration of at least a portion of a machine learning project.

In some embodiments, at least a portion of a machine learning project may be developed, refined, evaluated, and/or deployed from a third-party workspace using a third-party routine set of the third-party workspace and the first-party routine set 324. For example, by controlling the configuration of the third-party workspaces, the first-party computing resource 304 may automatically augment the functionalities of each third-party workspace with the first-party routine set 324. In this way, a first-party routine from the first-party routine set 324 may be executed from the compute agnostic project workspace 302 (e.g., through a first-party command line interface (CLI), etc.) and/or a respective third-party workspace (e.g., through a third-party CLI, etc.).

In some embodiments, the first-party routine set 324 includes a plurality of first-party routines that are accessible through one or more interfaces (e.g., first-party CLIs, user interfaces, etc.) of the compute agnostic project workspace 302. In some examples, a call to a particular first-party routine may depend on an interface that facilitated the call. For example, a publication request routine may be called from an interface corresponding to one or more of the sub-workspaces of the compute agnostic project workspace. The publication request routine may automatically incorporate the location from which it was called as a parameter for facilitating a publication request. By way of example, a publication request routine called from an interface corresponding to a first sub-workspace 310 may initiate a publication action at the corresponding first third-party workspace 316, whereas a publication request routine called from an interface corresponding to the second sub-workspace 312 may initiate a publication action at the corresponding second third-party workspace 318.

In some embodiments, each sub-workspace of the compute agnostic project workspace 302 is associated with a corresponding user interface. For instance, the first sub-workspace 310 and the first third-party workspace 316 may be associated with a first stage (e.g., the data preparation stage, etc.) of the machine learning project. The first sub-workspace 310 may be associated with a first project interface corresponding to the first stage. The first project interface may include data associated with the first stage and/or one or more interactive third-party links to the first third-party workspace 316. One or more of the interactive third-party links may call a first-party routine to initiate an action at the first third-party workspace 316. In some examples, each sub-workspace of the compute agnostic project workspace 302 may include an interactive third-party link for initiating the performance of an action at respective third-party workspaces.

In some embodiments, the first-party computing resource 304 may receive user input indicative of (e.g., including an identifier of) a selection of at least one of the one or more interactive third-party links from a respective sub-workspace. In response to the user input, the first-party computing resource 304 may initiate, via the first-party routine set 324, the performance of a computing action at the respective third-party workspace. The computing action may include any of a plurality of actions facilitated by the first-party routine set 324. As some examples, the computing action may include an access request for accessing a respective third-party workspace, a publication request for publishing at least a portion of the machine learning project to the compute agnostic project workspace 302 and/or a unified repository, an evaluation request for evaluating one or more aspects of the machine learning project hosted by a respective third-party workspace, and/or the like.

In some embodiments, the first-party routine set defines a plurality of first-party routines for managing and evaluating aspects of a machine learning project from one centralized workspace. The plurality of first-party routines may include any number and/or any type of routine depending on the requirements of the first-party. For instance, the first-party routines may include data evaluation and/or fairness routines that evaluate whether a machine learning project complies with one or more first-party standards. In some examples, the first-party routines may restrict the use and/or visibility of an aspect of a project based on evaluation measures implemented by the first-party routines. For instance, the first-party routines may include a publication request routine for publishing a portion of a machine learning project from a third-party workspace to one or more repositories provided by the first-party computing resource 304. In some examples, the publication request routine may leverage one or more project quality routines to enforce standardized publication criteria established by the first-party.

In some embodiments, a publication request routine is a data entity that represents a particular computing functionality implemented by the first-party routine set 324. The publication request routine may initiate the transfer of data from a third-party workspace to the compute agnostic project workspace 302 and/or another memory location of the first-party computing resource 304. By way of example, the publication request routine may trigger a webhook (e.g., a programmable intermediary, etc.) of a first-party routine set 324 installed within a third-party workspace to relay data from the third-party workspace to the compute agnostic project workspace 302.

In some embodiments, the first-party computing resource 304 receives, via the first-party routine set 324, a publication request. The publication request may be initiated and/or received from the compute agnostic project workspace 302 (e.g., a sub-workspace thereof). In addition, or alternatively, the publication request may be initiated and/or received from a third-party workspace of a third-party computing resource. The publication request may include a request generated in response to a call to a publication request routine of the first-party routine set 324.

In response to the publication request, the first-party computing resource 304 may generate evaluation data for at least an aspect of a machine learning project within a third-party workspace by initiating the performance of one or more project quality routines from the first-party routine set 324 within the third-party workspace.

In some embodiments, project quality routines are data entities that represent particular computing functionalities implemented by a first-party routine set 324. The project quality routines may include one or more verification functions for verifying one or more aspects of a machine learning project. By way of example, the project quality routines may include one or more scanning functions for verifying the completeness of a project, one or more compiling functions for verifying the executability of the project, one or more data evaluation functions for verifying the data quality for a project, one or more model evaluation functions for verifying the model performance for a project, and/or the like. In some examples, the project quality routines may be included within a first-party routine set 324 installed within a third-party workspace to allow a first-party computing resource 304 to check project quality at the third-party workspace. By way of example, a call to a publication request routine may initiate the performance of the project quality routines within a third-party workspace to generate evaluation data for the machine learning project. In some examples, the publication request routine may be configured to relay data from the third-party workspace based on the evaluation data.

In some embodiments, evaluation data is a data entity that represents one or more evaluated aspects of a machine learning project. The evaluation data may include a plurality of project quality metrics generated by the project quality routines. The project quality metrics may include one or more data quality metrics, such as data fairness, completeness, and/or the like, one or more model quality metrics, such as model fairness, overall performance, and/or the like, and/or any other metrics for evaluating a machine learning project.

In some embodiments, in response to publication request, the first-party computing resource 304 modifies the compute agnostic project workspace 302 based on a comparison between evaluation data for an aspect of a machine learning project and one or more publication criteria.

In some embodiments, publication criteria is a data entity that represents one or more first-party requirements for receiving and/or providing data from a third-party workspace. The publication criteria may include one or more project quality thresholds for determining whether to accept data from a third-party workspace. The publication criteria, for example, may include one or more project quality thresholds indicative of (e.g., including an identifier of) an acceptable publication threshold for each of the project quality metrics. The project quality thresholds, for example, may include one or more threshold requirements that are tailored to each of the project quality metrics generated for a machine learning project. For example, the project quality thresholds may include a data quality threshold for evaluating a data quality metric for a machine learning project. As another example, the project quality thresholds may include a model quality threshold for evaluating a model quality metric for a machine learning project.

In some embodiments, the publication criteria establish one or more different sets of first-party requirements for publishing portions of a machine learning project to different privilege levels of the first-party. By way of example, the publication criteria may include a first set of project quality thresholds for publishing data from a third-party workspace to the compute agnostic project workspace 302. In addition, or alternatively, the publication criteria may include a second set of project quality thresholds for publishing data from a third-party workspace to a unified project repository hosted by the first-party computing resource 304. The second set of project quality thresholds may be stricter than the first set of project quality thresholds such that the project is held to a higher standard as the level of visibility for a project increases.

In some embodiments, the compute agnostic project workspace 302 is modified by pulling data from a third-party workspace to populate a sub-workspace of the compute agnostic project workspace 302. For example, in response to a publication request initiated from the first sub-workspace and/or a corresponding first third-party workspace 316, the first-party computing resource 304 may cause the first third-party workspace 316 to generate evaluation data. In the event that the evaluation data satisfies publication criteria for publishing data from the first third-party workspace 316 to the compute agnostic project workspace 302, the first-party computing resource 304 may receive, retrieve, and/or otherwise accept project data from the first third-party workspace 316. The project data may include a state of at least one aspect of the machine learning project that may be reflective of one or more characteristics for a particular stage of the machine learning project.

In addition, or alternatively, in some embodiments, the compute agnostic project workspace 302 is modified by generating and/or modifying a canonical representation 328 of the machine learning project. For example, in response to determining that the machine learning project satisfies publication criteria for publishing data from a respective third-party workspace to a canonical representation 328 of the machine learning project, the first-party computing resource 304 may generate the canonical representation 328 of the machine learning project that represents one or more model attributes for the machine learning project. The one or more model attributes, for example, may include one or more model quality metrics for the machine learning project.

In some embodiments, the canonical representation 328 is a data entity that represents a standardized representation of a machine learning project. The canonical representation 328 may include a plurality of model attributes that describe one or more aspects of the machine learning project. For example, the canonical representation 328 may include evaluation data for the machine learning project. In addition, or alternatively, the canonical representation 328 may include interfaces (e.g., interactive links, pointers, API endpoints, etc.) for accessing the machine learning model and/or workspace for a portion of the machine learning model (e.g., hosted by a first-party and/or third-party resource, etc.).

As described herein, the first-party computing resource 304 may generate a compute agnostic project workspace 302 that facilitates the configuration, development, refinement, review, and deployment of a machine learning project across a plurality of distinct, incompatible, third-party computing resources. To do so, the first-party computing resource 304 provides a plurality of interfaces for managing and configuring a plurality of disparate third-party workspaces. One such interface includes the configuration interface 326. An example of the configuration interface 326 will now further be described with reference to FIG. 4.

Figure 4:
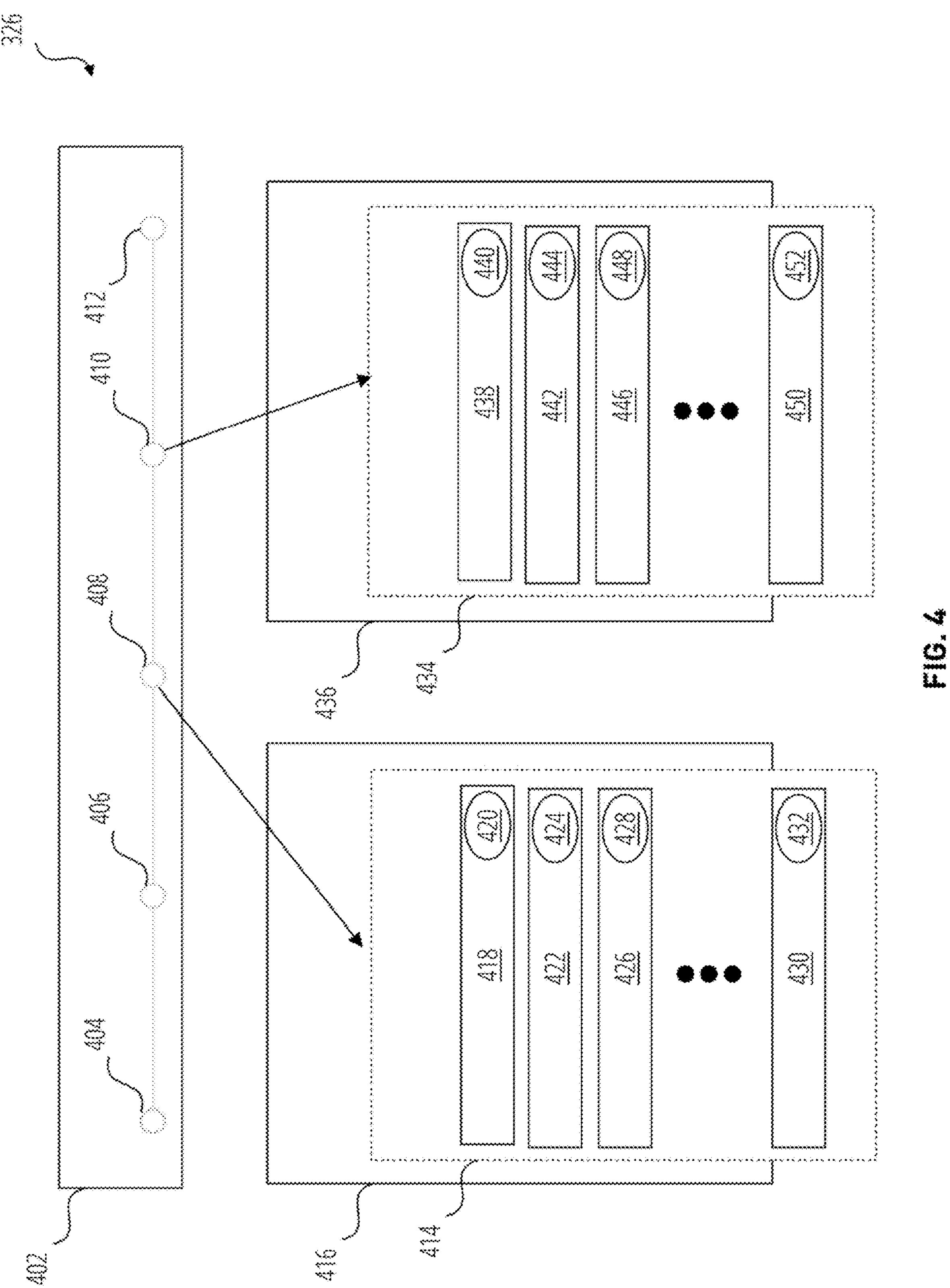
FIG. 4 is an operational example of a configuration interface in accordance with some embodiments discussed herein.

FIG. 4 is an operational example of a configuration interface 326 in accordance with some embodiments discussed herein. The configuration interface 326 may include a plurality of selection interfaces, each tailored to a particular stage of a machine learning project. For instance, the configuration interface 326 may be based on a project configuration lifecycle 402 that defines a plurality of configuration stages for incrementally configuring a compute agnostic project workspace to facilitate the machine learning project. Each stage of the project configuration lifecycle 402 may be associated with a corresponding selection interface for receiving information for a particular component of the compute agnostic project workspace. FIG. 4 depicts two such interfaces, a first selection interface 416 and second selection interface 436, for purposes of illustration.

In some embodiments, the project configuration lifecycle 402 includes a first configuration stage 404 (e.g., a project details stage, etc.) for providing one or more contextual attributes for the machine learning project. The contextual attributes may include a project name, a project description, one or more users with access to the project, one or more user subscriptions, and/or the like.

In some embodiments, the project configuration lifecycle 402 includes a second configuration stage 406 (e.g., a requirements stage, etc.) for establishing one or more first-party requirements for the machine learning project. For example, during the second configuration stage 406, a user may provide responsible use information indicative of (e.g., including an identifier of) an intended use of the machine learning project. The responsible use information, for example, may include an anticipated benefit provided by the machine learning project, an intended use, a line of business and/or population served, an impacted population type, an impacted population size, and/or the like. The first-party requirements, for example, may include the publication criteria and/or acceptable publication thresholds for the machine learning project. In some examples, the publication criteria may be based on the contextual attributes for the machine learning project.

In some embodiments, the project configuration lifecycle 402 includes a third configuration stage 408 (e.g., data collections stage, etc.) for selecting one or more third-party computing resources for handling data for the machine learning project. By way of example, the third configuration stage 408 may be associated with a first selection interface 416 for selecting one or more third-party computing resources to handle a data preparation stage of the machine learning project. The first selection interface 416 may include a first selectable list 414 for selecting one or more third-party computing resources. The first selectable list 414 may include one or more interactive selection widgets indicative of (e.g., including an identifier of) a first plurality of third-party computing resources for data configuration. By way of example, the first selectable list 414 may include a first selectable icon 420 corresponding to a first data configuration resource 418, a second selectable icon 424 corresponding to a second data configuration resource 422, a third selectable icon 428 corresponding to a third data configuration resource 426, a fourth selectable icon 432 corresponding to a fourth data configuration resource 430, and/or the like.

In some examples, the first selectable list 414 is dynamically determined based on the contextual attributes for the machine learning project, one or more user subscriptions, and/or third-party data for a plurality of third-party computing resources. For example, the first selectable list 414 may include each third-party computing resource that is associated with one or more user subscriptions for a user and/or user group associated with the machine learning project. In some examples, the first selectable list 414 may include a curated list of third-party computing resources for a machine learning project that is based on one or more historical trends and/or other data associated with the machine learning project. By way of example, a machine learning model may be trained to generate an optimized list of third-party computing resources based on the performance (and/or reviews, etc.) of a plurality of historical machine learning projects. In some examples, the machine learning model may generate the optimized list of third-party computing resources based on the contextual attributes for the machine learning project. In some examples, the first selectable list 414 may include a selectable icon for each of the optimized list of third-party computing resources.

In some embodiments, the project configuration lifecycle 402 includes a fourth configuration stage 410 (e.g., model workspaces stage, etc.) for selecting one or more third-party computing resources for handling model configuration for the machine learning project. By way of example, the fourth configuration stage 410 may be associated with a second selection interface 436 for selecting one or more third-party computing resources to handle a model experiment stage of the machine learning project. The second selection interface 436 may include a second selectable list 434 for selecting one or more third-party computing resources. The second selectable list 434 may include one or more interactive selection widgets indicative of (e.g., including identifiers of) a second plurality of third-party computing resources for model configuration. By way of example, the second selectable list 434 may include a first selectable icon 440 corresponding to a first model configuration resource 438, a second selectable icon 444 corresponding to a second model configuration resource 442, a third selectable icon 448 corresponding to a third model configuration resource 446, a fourth selectable icon 452 corresponding to a fourth model configuration resource 450, and/or the like.

In some examples, the second selectable list 434 is dynamically determined based on the contextual attributes for the machine learning project, one or more user subscriptions, third-party data for a plurality of third-party computing resources, and/or one or more previously selected third-party computing resources for the machine learning project. For example, the second selectable list 434 may include each third-party computing resource that is associated with one or more user subscriptions for a user and/or user group associated with the machine learning project. In some examples, the second selectable list 434 may include a curated list of third-party computing resources for a machine learning project that is based on one or more historical trends and/or other data associated with the machine learning project. By way of example, a machine learning model may be trained to generate an optimized list of third-party computing resources based on the performance (and/or reviews, etc.) of a plurality of historical machine learning projects. In some examples, the machine learning model may generate the optimized list of third-party computing resources based on the contextual attributes for the machine learning project and/or one or more previously selected third-party computing resources. In some examples, the second selectable list 434 may include a selectable icon for each of the optimized list of third-party computing resources.

In some embodiments, the project configuration lifecycle 402 includes a fifth configuration stage 412 (e.g., review stage, etc.) for reviewing configuration data for the machine learning project. The configuration data, for example, may include one or more previously selected third-party computing resources, the contextual attributes, the first-party requirements, and/or the like.

Once generated, a first-party computing resource may generate a compute agnostic project workspace for a machine learning project based on the configuration data. The compute agnostic project workspace may include a plurality of sub-workspaces for facilitating multiple different stages of a machine learning project across different third-party computing resources. The compute agnostic project workspace and/or one or more sub-workspaces thereof may be associated with one or more project interfaces for facilitating each stage of the machine learning project. One or more example project interfaces will now further be described with reference to FIGS. 5A-E.

Figure 5B:
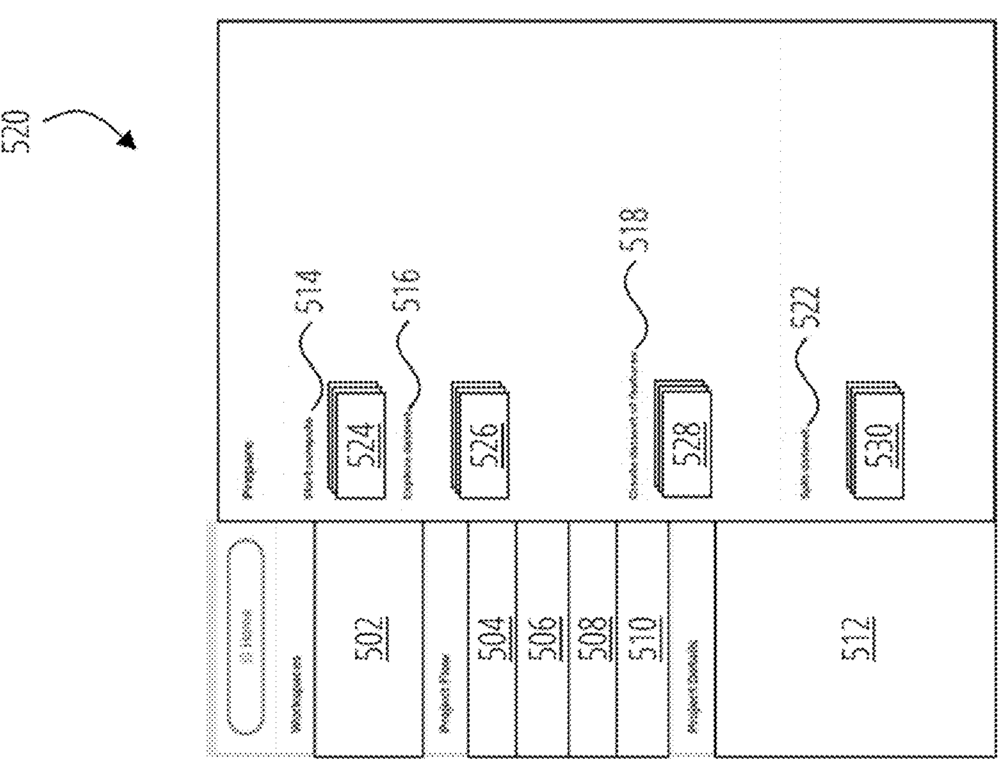
FIG. 5B is an operational example of a data preparation interface in accordance with some embodiments discussed herein.
Figure 5A:
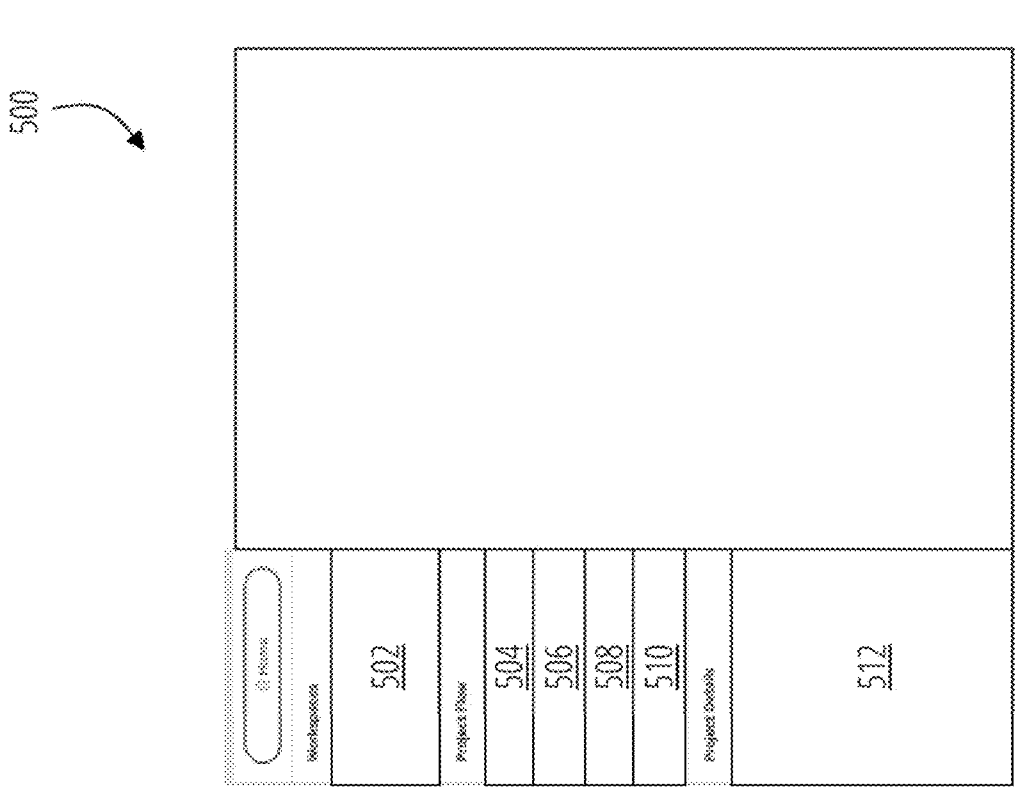
FIG. 5A is an operational example of a compute agnostic project workspace interface in accordance with some embodiments discussed herein.

FIG. 5A is an operational example of a compute agnostic project workspace interface 500 in accordance with some embodiments discussed herein. The compute agnostic project workspace interface 500 may include a plurality of nested sub-workspace interfaces, each tailored to a particular component of a machine learning project. The compute agnostic project workspace interface 500 may include a navigation pane with a plurality of navigation links to a plurality of interfaces corresponding to the various sub-workspaces of the compute agnostic project workspace.

For example, the compute agnostic project workspace interface 500 may include one or more third-party workspace links 502 for navigating a user to respective third-party workspaces associated within compute agnostic project workspace.

In addition, or alternatively, the compute agnostic project workspace interface 500 may include one or more project workflow lifecycle links for navigating a user to an interface of a respective sub-workspace corresponding to a respective stage of the project workflow lifecycle. For example, the project workflow lifecycle links may include a data preparation interface link 504 for transitioning to a data preparation interface corresponding to a data preparation stage of the project workflow lifecycle, a model experiment interface link 506 for transitioning to a model experiment interface corresponding to a model experiment stage of the project workflow lifecycle, a model review interface link 508 for transitioning to a model review interface corresponding to a model review stage of the project workflow lifecycle, and/or model deployment interface link 510 for transitioning to a model deployment interface corresponding to a model deployment stage of the project workflow lifecycle.

In some examples, the compute agnostic project workspace interface 500 may include contextual data links 512 for navigating to one or more contextual interfaces of the compute agnostic project workspace. The contextual data links 512, for example, may include one or more project details, such as one or more model and/or data statistics, cost statistics (e.g., expended compute power for developing the project, etc.), responsible use statistics (e.g., fairness metrics, etc.), and/or the like.

An example data preparation interface will now further be described with reference to FIG. 5B.

FIG. 5B is an operational example of a data preparation interface 520 in accordance with some embodiments discussed herein. The data preparation interface 520 may correspond to a first sub-workspace for facilitating a data preparation stage of the project workflow lifecycle. The data preparation interface 520 may include a plurality of sections for incrementally preparing a machine learning project by assembling and processing one or more datasets. Each section may include one or more interactive links for calling a first-party routine to initiate an action within the compute agnostic project workspace and/or a third-party workspace corresponding to the first sub-workspace.

In some embodiments, the data preparation interface 520 may include a compute initialization section 514 for initializing a compute instance (e.g., virtual machine, clusters, etc.) for executing at least a portion of the machine learning project. The compute initialization section 514 may include one or more interactive compute initialization links 524 for calling a first-party routine configured to instantiate a compute instance for the machine learning project.

In some embodiments, the data preparation interface 520 may include a data exploration section 516 for querying and analyzing selected datasets as frames. The data exploration section 516 may include one or more interactive data exploration links 526 for calling a first-party routine configured to explore selected datasets, create standard statistics and/or distributions, prioritize columns and/or properties for use in the machine learning project, and/or the like.

In some embodiments, the data preparation interface 520 may include a feature creation section 518 for transforming and/or categorizing a dataset into features for a machine learning model. The feature creation section 518 may include one or more feature creation links 528 for calling a first-party routine configured to create, categorize, and/or otherwise handle features of a dataset.

In some embodiments, the data preparation interface 520 may include a split dataset section 522 for splitting a prepared dataset into different subsets for training, validation, evaluation, and/or the like. The split dataset section 522 may include dataset designation links 530 for calling a first-party routine configured to designate one or more subsets of a prepared dataset as a training dataset, validation dataset, evaluation dataset, and/or the like.

An example model experiment interface will now further be described with reference to FIG. 5C.

Figure 5C:
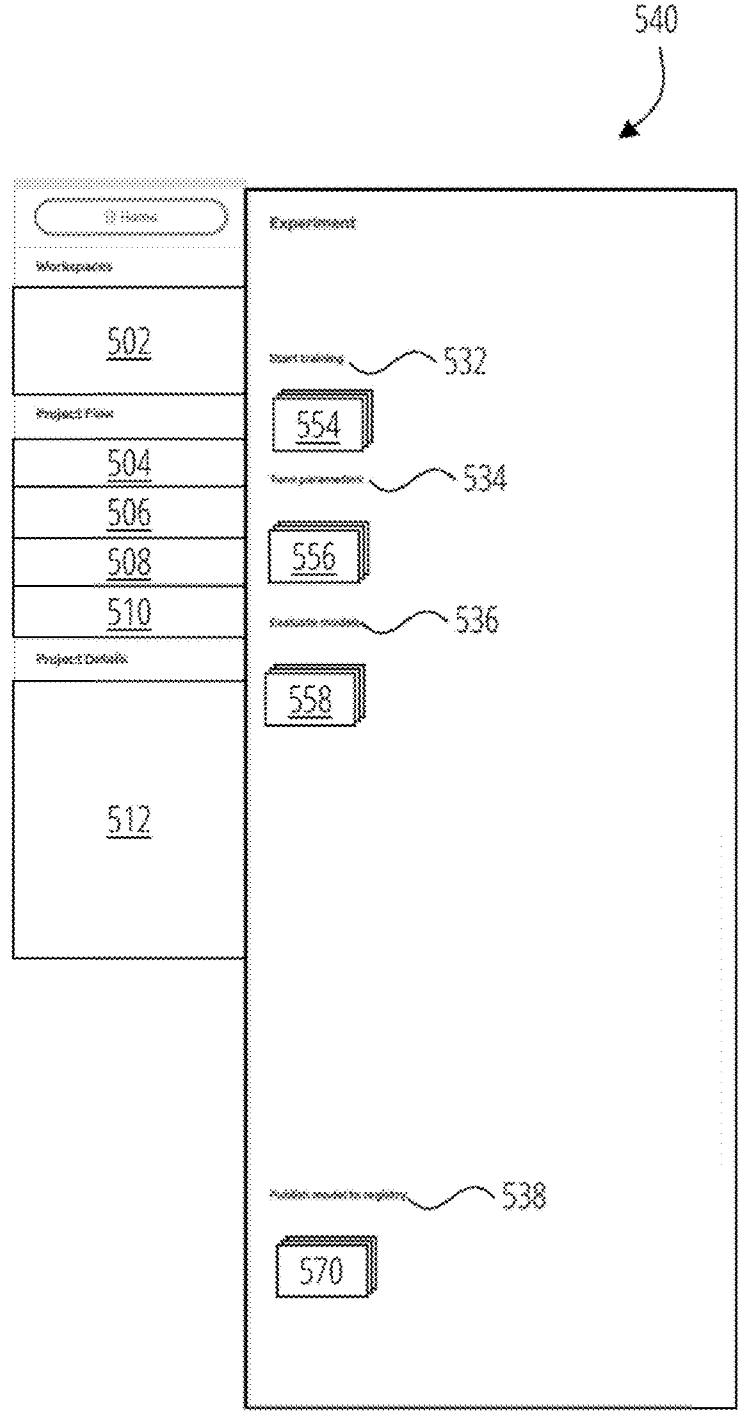
FIG. 5C is an operational example of a model experiment interface in accordance with some embodiments discussed herein.

FIG. 5C is an operational example of a model experiment interface 540 in accordance with some embodiments discussed herein. The model experiment interface 540 may correspond to a second sub-workspace for facilitating a model experiment stage of the project workflow lifecycle. The model experiment interface 540 may include a plurality of sections for incrementally preparing a machine learning project by configuring, training, and refining parameters of a machine learning model. Each section may include one or more interactive links for calling a first-party routine to initiate an action within the compute agnostic project workspace and/or a third-party workspace corresponding to the second sub-workspace.

In some embodiments, the model overview section 542 may include a model training section 532 for training a machine learning model using a prepared dataset. The model training section 532 may include one or more interactive training links 554 for calling a first-party routine configured to use one or more data science tools (e.g., of a first-party routine set, a third-party routine set, etc.) for training a model over a training dataset.

In some embodiments, the model overview section 542 may include a model tuning section 534 for tuning one or more parameters of a machine learning model. The model tuning section 534 may include one or more interactive tuning links 556 for calling a first-party routine configured to explore and/or tune options available for a selected machine learning model architecture.

In some embodiments, the model overview section 542 may include a model evaluation section 536 for evaluating a machine learning model's performance. The model evaluation section 536 may include one or more interactive evaluation links 558 for calling a first-party routine configured to calculate one or more model quality metrics for a machine learning project.

In some embodiments, the model overview section 542 may include a model publication section 538 for publishing one or more portions of the machine learning project. The model publication section 538 may include one or more interactive publication links 570 for calling a first-party routine (e.g., publication request routine) configured to publish one or more portions of the machine learning project.

An example model review interface will now further be described with reference to FIG. 5D.

Figure 5E:
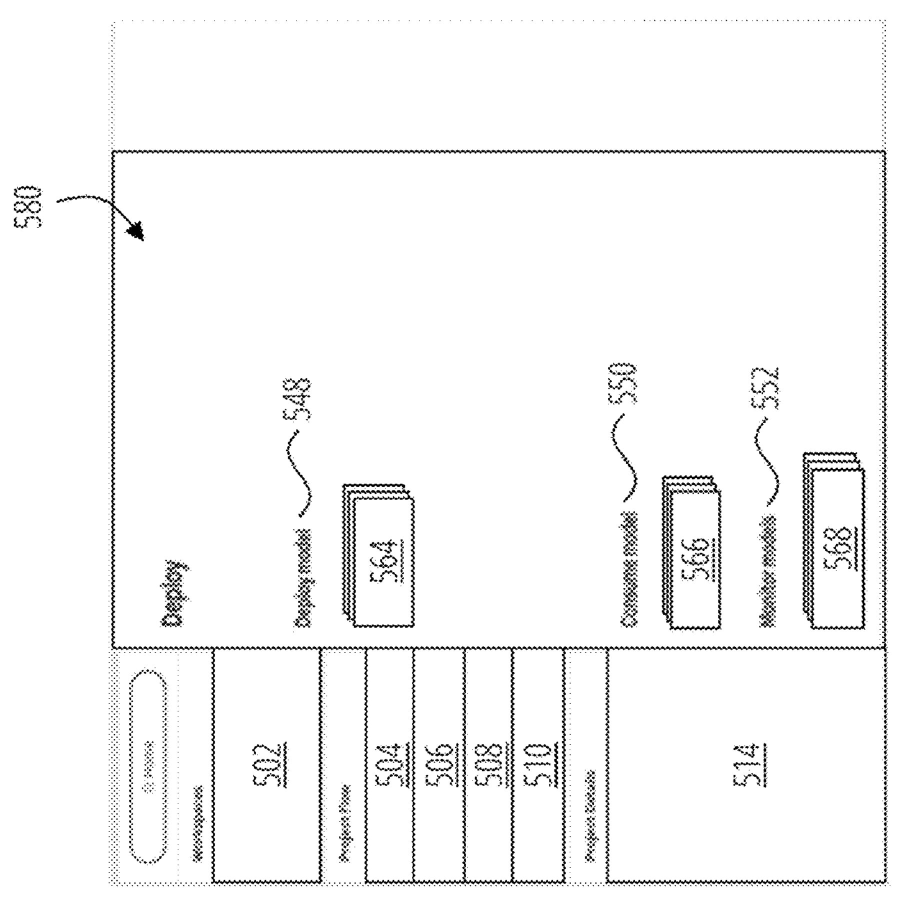
FIG. 5E is an operational example of a model deployment interface in accordance with some embodiments discussed herein.
Figure 5D:
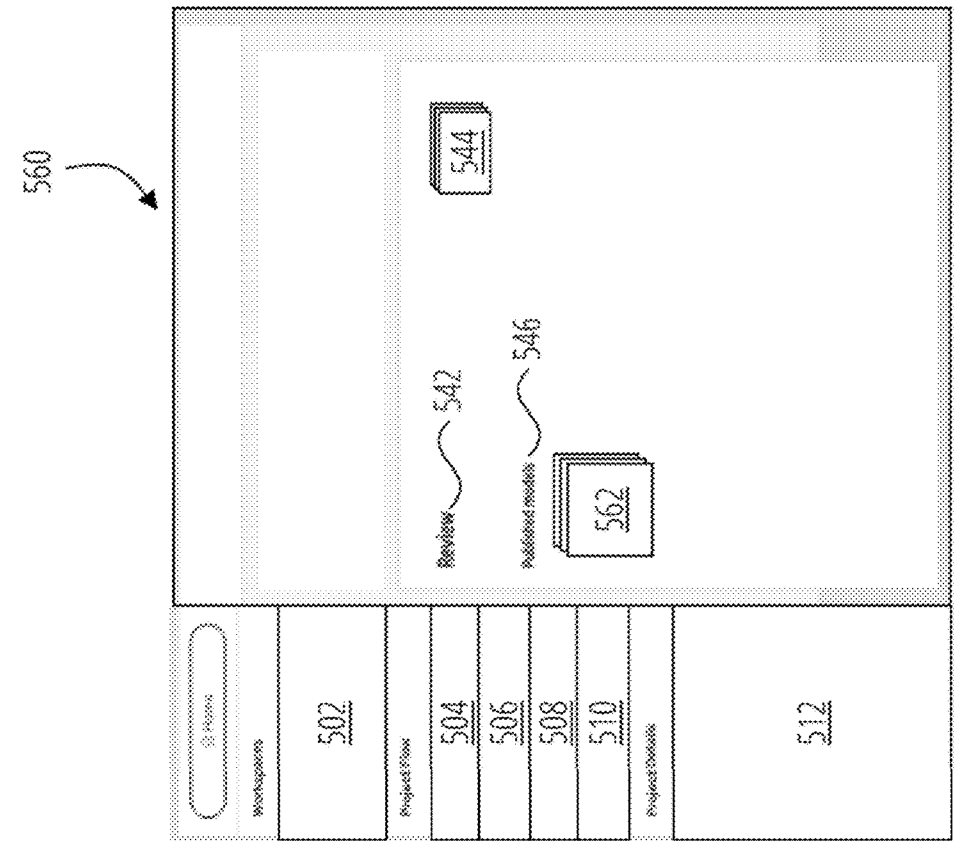
FIG. 5D is an operational example of a model review interface in accordance with some embodiments discussed herein.

FIG. 5D is an operational example of a model review interface 560 in accordance with some embodiments discussed herein. The model review interface 560 may correspond to a third sub-workspace for facilitating a model review stage of the project workflow lifecycle. The model experiment interface 540 may include a plurality of sections for reviewing a machine learning project. Each section may include one or more interactive links for calling a first-party routine to initiate an action within the compute agnostic project workspace and/or a third-party workspace corresponding to the third sub-workspace.

In some embodiments, the model review interface 560 may include a model overview section 542 for reviewing a published machine learning model. The model overview section 542 may include one or more interactive review links 544 for calling a first-party routine configured to access one or more portions of the machine learning project.

In some embodiments, the model review interface 560 may include a published model section 546 for reviewing one or more published machine learning projects for a particular user and/or user group. The published model section 546 may include one or more interactive published model links 562 for calling a first-party routine configured to access each of the one or more published machine learning projects.

An example model deployment interface will now further be described with reference to FIG. 5E.

FIG. 5E is an operational example of a model deployment interface 580 in accordance with some embodiments discussed herein. The model deployment interface 580 may correspond to a fourth sub-workspace for facilitating a model deployment stage of the project workflow lifecycle. The model deployment interface 580 may include a plurality of sections for deploying and/or managing a deployed machine learning project. Each section may include one or more interactive links for calling a first-party routine to initiate an action within the compute agnostic project workspace and/or a third-party workspace corresponding to the third sub-workspace.

In some embodiments, the model deployment interface 580 may include a model deployment section 548 for deploying a selected model. The model deployment section 548 may include one or more interactive deployment links 564 for calling a first-party routine configured to create an API endpoint and provision tokens for authorizing access and use of a machine learning model.

In some embodiments, the model deployment interface 580 may include a model consumption section 550 for requesting an API token for the model. The model consumption section 550 may include one or more interactive consumption links 566 for calling a first-party routine configured to request a token for a machine learning model. In some examples, the interactive consumption links 566 may call a first-party routine configured to accept and/or reject a request for the token.

In some embodiments, the model deployment interface 580 may include a model monitoring section 552 for monitoring the performance of a model. The model monitoring section 552 may include one or more interactive monitoring links 568 for calling a first-party routine configured to monitor performance changes for a machine learning model, view usage of the machine learning model, handle user permission for the machine learning model, and/or the like.

An example canonical representation will now further be described with reference to FIG. 6.

Figure 6:
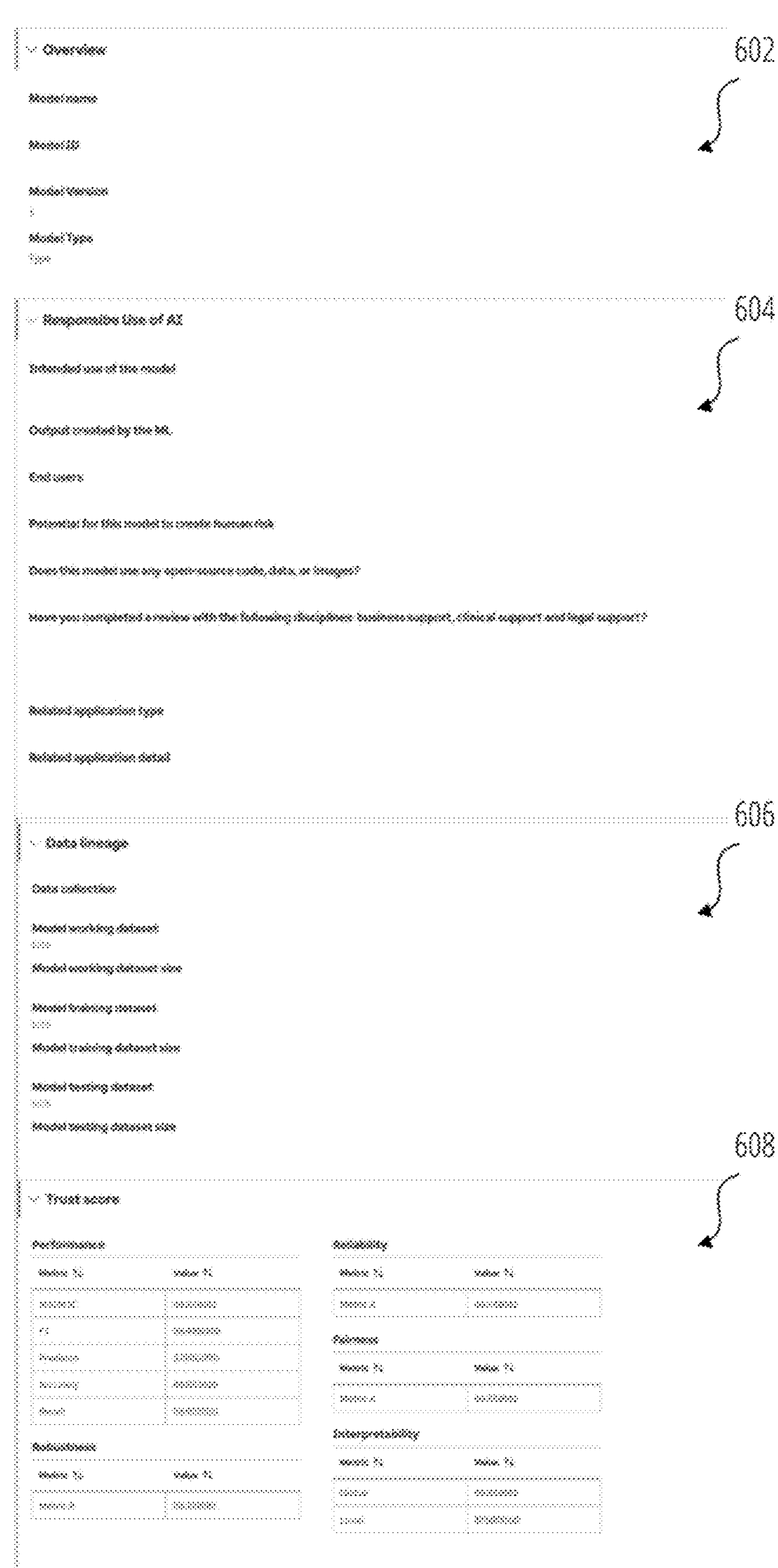
FIG. 6 is an operational example of a canonical representation in accordance with some embodiments discussed herein.

FIG. 6 is an operational example of a canonical representation 328 in accordance with some embodiments discussed herein. In some embodiments, the canonical representation 328 is a standardized representation for a machine learning project. The canonical representation 328 may include a plurality of sections representing one or more aspects of the machine learning project. Each section may be populated by aggregating information from a plurality of third-party computing resources involved in the machine learning project.

In some embodiments, the canonical representation 328 may include an overview section 602, a contextual section 604, a dataset information section 606, an evaluation section 608, and/or other sections of information related to a machine learning project. The overview section 602 may represent a model name, a model identifier, a model version, a model type, and/or the like. The contextual section 604 may represent an intended user of the model, an output from the model, an end user, a potential for fairness risks, an indication of data sources, a rationale for using the model, a related application type/detail, and/or the like. The dataset information section 606 may represent a data collection, a model working dataset (e.g., one or more interactive links to third-party workspace maintaining the model dataset), a model working dataset size, a model training dataset (e.g., one or more interactive links to third-party workspace maintaining the model training dataset), a model training dataset size, a model testing dataset (e.g., one or more interactive links to third-party workspace maintaining the model testing dataset), a model testing dataset size, and/or the like. The evaluation section 608 may represent evaluation data for a machine learning project. The evaluation data, for example, may include one or more project quality metrics, such as an aggregate trust score, one or more performance scores (e.g., AUCROC scores, F1 scores, precision scores, accuracy scores, recall scores, etc.), one or more robustness scores, one or more reliability scores, one or more fairness scores, one or more interpretability scores, and/or the like. In some examples, the one or more project quality metrics may include a standardized set of metrics defined by the first-party such that multiple machine learning projects created using one or more different combinations of computing resources may be compared against one another.

Figure 7:
FIG. 7 is a flowchart showing an example of a process for generating a compute agnostic project workspace in accordance with some embodiments discussed herein.
Figure 7:
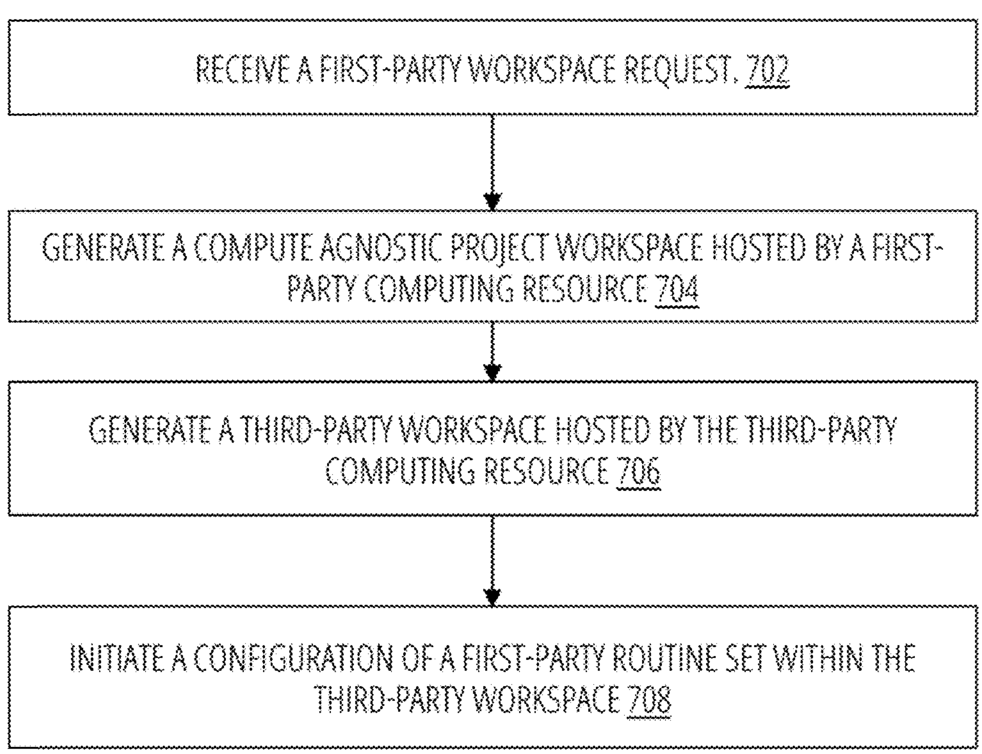

FIG. 7 is a flowchart showing an example of a process 700 for generating a compute agnostic project workspace in accordance with some embodiments discussed herein. The flowchart depicts new compute agnostic project workspace configuration and management techniques for generating a compute agnostic project workspace that overcome various limitations of traditional project workspaces that are limited to the local functionalities provided by their respective computing resources. The workspace configuration and management techniques may be implemented by one or more computing devices, entities, and/or systems described herein. For example, via the various steps/operations of the process 700, the computing system 100 may leverage the workspace configuration and management techniques to overcome the various limitations with traditional project workspaces by facilitating a compute agnostic project workspace capable of seamlessly leveraging compute functionalities across a plurality of different computing resources from one central location.

FIG. 7 illustrates an example process 700 for explanatory purposes. Although the example process 700 depicts a particular sequence of steps/operations, the sequence may be altered without departing from the scope of the present disclosure. For example, some of the steps/operations depicted may be performed in parallel or in a different sequence that does not materially impact the function of the process 700. In other examples, different components of an example device or system that implements the process 700 may perform functions at substantially the same time or in a specific sequence.

In some embodiments, the process 700 includes, at step/operation 702, receiving a first-party workspace request. For example, the computing system 100 may receive the first-party workspace request. In some examples, the first-party workspace request may be indicative of (e.g., include an identifier of) a third-party computing resource. In some examples, the first-party workspace request may be indicative of (e.g., include identifiers of) a plurality of third-party computing resources. In some embodiments, the first-party workspace request includes selection input.

In some examples, the computing system 100 may provide a first selection interface for display. The first selection interface may include one or more interactive data selection widgets indicative of (e.g., including identifiers of) a first plurality of third-party computing resources for data configuration. The computing system 100 may receive a first selection input from the first selection interface hosted by the first-party computing resource. The first selection input may identify a first third-party computing resource for configuring a training dataset for the machine learning model.

In some examples, the computing system 100 may provide a second selection interface for display. The second selection interface may include one or more interactive compute selection widgets indicative of (e.g., including identifiers of) a second plurality of third-party computing resources for model configuration. The computing system 100 may receive a second selection input from a second selection interface hosted by the first-party computing resource. The second selection input may identify a second third-party computing resource for configuring a training dataset for the machine learning model.

In some examples, the first third-party computing resource and the second third-party computing resource may be different third-party computing resources.

In some embodiments, the process 700 includes, at step/operation 704, generating a compute agnostic project workspace hosted by a first-party computing resource. For example, the computing system 100 may generate the compute agnostic project workspace hosted by the first-party computing resource. In some examples, the computing system 100 may generate the compute agnostic project workspace in response to the first-party workspace request.

In some embodiments, the compute agnostic project workspace includes a plurality of sub-workspaces for the machine learning project. Each sub-workspace may be associated with one of a plurality of stages of development for the machine learning project. In some examples, the plurality of stages of development may include a data preparation stage, a model experiment stage, a model review stage, and/or a model deployment stage.

In some embodiments, the process 700 includes, at step/operation 706, initiating the generation of a third-party workspace hosted by a third-party computing resource. For example, the computing system 100 may initiate the generation of the third-party workspace hosted by the third-party computing resource. In some examples, the computing system 100 may initiate the generation of the third-party workspace in response to the first-party workspace request. The computing system 100 may initiate the generation of a respective third-party workspace for each of the plurality of third-party computing resources identified by the first-party workspace request.

In some examples, the first-party workspace request may be associated with one or more user subscriptions. The one or more user subscriptions may be indicative of (e.g., include identifiers of) one or more resource permissions for the third-party computing resource. For example, the one or more resource permissions may be indicative of (e.g., include identifiers of) at least one of an amount of allocated space for a user and/or an amount of allocated compute power for the user. The third-party workspace may be generated using the one or more user subscriptions.

In some embodiments, the process 700 includes, at step/operation 708, initiating the configuration of a first-party routine set within the third-party workspace. For example, the computing system 100 may initiate the configuration of the first-party routine set within the third-party workspace. In some examples, the computing system 100 may initiate the configuration of the first-party routine set within the third-party workspace in response to the first-party workspace request. The first-party routine set may include a plurality of callbacks for facilitating communication between the first-party computing resource and the third-party computing resource. The computing system 100 may initiate the configuration of the first-party routine set within the respective third-party workspace for each of the plurality of third-party computing resources to facilitate communication between the first-party computing resource and each of the plurality of third-party computing resources.

Figure 8:
FIG. 8 is a flowchart showing an example of a process for generating a compute agnostic project workspace in accordance with some embodiments discussed herein.
Figure 8:
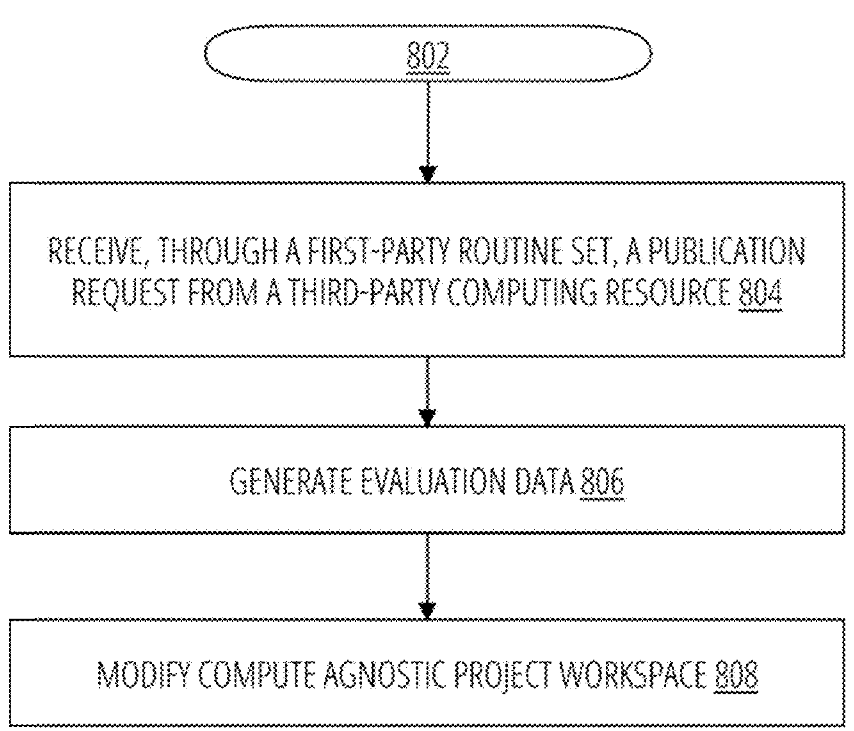

FIG. 8 is a flowchart showing an example of a process 800 for modifying a compute agnostic project workspace in accordance with some embodiments discussed herein. The flowchart depicts new compute agnostic project workspace configuration and management techniques for modifying a compute agnostic project workspace that overcome various limitations of traditional project workspaces that are limited to the local functionalities provided by their respective computing resources. The workspace configuration and management techniques may be implemented by one or more computing devices, entities, and/or systems described herein. For example, via the various steps/operations of the process 800, the computing system 100 may leverage the workspace configuration and management techniques to overcome the various limitations with traditional project workspaces by selectively aggregating pre evaluated information across a plurality of different computing resources within a compute agnostic project workspace.

FIG. 8 illustrates an example process 800 for explanatory purposes. Although the example process 800 depicts a particular sequence of steps/operations, the sequence may be altered without departing from the scope of the present disclosure. For example, some of the steps/operations depicted may be performed in parallel or in a different sequence that does not materially impact the function of the process 800. In other examples, different components of an example device or system that implements the process 800 may perform functions at substantially the same time or in a specific sequence.

In some embodiments, the process 800 includes, at step/operation 802, receiving, through a first-party routine set, a publication request from a third-party computing resource. For example, the computing system 100 may receive, through the first-party routine set, the publication request from the third-party computing resource.

In some embodiments, a first sub-workspace of the compute agnostic project workspace and the third-party workspace may be associated with a first stage of the plurality of stages of development. The computing system 100 may generate a first project interface corresponding to the first stage. The first project interface may include one or more interactive third-party links to the third-party workspace. The computing system 100 may receive user input indicative of (e.g., including an identifier of) a selection of at least one of the one or more interactive third-party links. In response to the user input, the computing system 100 may initiate, through the first-party routine set, the performance of a computing action at the third-party workspace. The computing action may include an access request for accessing the third-party workspace. In addition, or alternatively, the computing action may include a publication request for publishing at least a portion of the machine learning project.

In some embodiments, the process 800 includes, at step/operation 804, generating evaluation data for the machine learning project. For example, in response to the publication request, the computing system 100 may generate the evaluation data for the machine learning project. For instance, the computing system 100 may generate the evaluation data for the machine learning project within the third-party workspace by initiating the performance of one or more project quality routines from the first-party routine set within the third-party workspace. The computing system 100 may generate the evaluation data in response to the publication request.

In some embodiments, the process 800 includes, at step/operation 806, modifying a compute agnostic project workspace. For example, the computing system 100 may modify the compute agnostic project workspace based on the evaluation data. For instance, the computing system 100 may modify the compute agnostic project workspace based on a comparison between the evaluation data and one or more publication criteria. In some examples, the publication criteria includes one or more model quality thresholds indicative of (e.g., including identifiers of) an acceptable publication threshold for each of the one or more model quality metrics. In response to determining that the machine learning project satisfies the publication criteria, the computing system may generate a canonical representation of the machine learning project that includes one or more model attributes for the machine learning project. The one or more model attributes may include one or more model quality metrics for the machine learning project.

VI. Conclusion

Many modifications and other embodiments will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. Examples

Example 1. A computer-implemented method performed by a first-party computing resource configured to facilitate a first stage of a machine learning project, the computer-implemented method comprising receiving, by one or more processors of the first-party computing resource, a first-party workspace request that is indicative of a third-party computing resource for facilitating a second stage of the machine learning project; and in response to the first-party workspace request generating, by the one or more processors, a compute agnostic project workspace hosted by the first-party computing resource that is configured to access a third-party workspace hosted by the third-party computing resource, initiating, by the one or more processors, the generation of the third-party workspace, and initiating, by the one or more processors, the configuration of a first-party routine set within the third-party workspace, wherein the first-party routine set comprises a plurality of callbacks for facilitating communication between the first-party computing resource and the third-party computing resource.

Example 2. The computer-implemented method of example 1 further comprising receiving, through the first-party routine set, a publication request from the third-party computing resource; and in response to the publication request generating evaluation data for a portion of the machine learning project within the third-party workspace by initiating the performance of one or more project quality routines from the first-party routine set within the third-party workspace, and modifying the compute agnostic project workspace based on a comparison between the evaluation data and one or more publication criteria.

Example 3. The computer-implemented method of example 2, wherein modifying the compute agnostic project workspace comprises in response to determining that the machine learning project satisfies the one or more publication criteria, generating a canonical representation of the machine learning project that comprises one or more model attributes for the machine learning project.

Example 4. The computer-implemented method of example 3, wherein the one or more model attributes comprise one or more model quality metrics for the machine learning project.

Example 5. The computer-implemented method of example 4, wherein the one or more publication criteria comprises one or more model quality thresholds indicative of an acceptable publication threshold for each of the one or more model quality metrics.

Example 6. The computer-implemented method of any of the preceding examples, wherein the first-party workspace request is indicative of a plurality of third-party computing resources, and wherein the computer-implemented method further comprises initiating the generation of a respective third-party workspace for each of the plurality of third-party computing resources; and initiating the configuration of the first-party routine set within the respective third-party workspace for each of the plurality of third-party computing resources to facilitate communication between the first-party computing resource and each of the plurality of third-party computing resources.

Example 7. The computer-implemented method of any of the preceding examples, wherein receiving the first-party workspace request comprises receiving a first selection input from a first selection interface hosted by the first-party computing resource, wherein the first selection input identifies a first third-party computing resource for configuring a training dataset for the machine learning project; and receiving a second selection input from a second selection interface hosted by the first-party computing resource, wherein the second selection input identifies a second third-party computing resource for configuring a model for the machine learning project.

Example 8. The computer-implemented method of example 7 further comprising providing the first selection interface for display, wherein the first selection interface comprises one or more interactive data selection widgets indicative of a first plurality of third-party computing resources for data configuration; and providing the second selection interface for display, wherein the second selection interface comprises one or more interactive compute selection widgets indicative of a second plurality of third-party computing resources for model configuration.

Example 9. The computer-implemented method of any of examples 7 or 8, wherein the first third-party computing resource and the second third-party computing resource are different third-party computing resources.

Example 10. The computer-implemented method of any of the preceding examples, wherein the compute agnostic project workspace comprises a plurality of sub-workspaces for the machine learning project, wherein each sub-workspace is associated with one of a plurality of stages of development for the machine learning project.

Example 11. The computer-implemented method of example 10, wherein the plurality of stages of development comprises a data preparation stage, a model experiment stage, a model review stage, and a model deployment stage.

Example 12. The computer-implemented method of any of examples 10 or 11, wherein a first sub-workspace and the third-party workspace are associated with the first stage of the plurality of stages of development, and wherein the computer-implemented method further comprises generating a first project interface corresponding to the first stage, wherein the first project interface comprises one or more interactive third-party links to the third-party workspace.

Example 13. The computer-implemented method of example 12 further comprising receiving user input indicative of a selection of at least one of the one or more interactive third-party links; and in response to the user input, initiating, through the first-party routine set, the performance of a computing action at the third-party workspace.

Example 14. The computer-implemented method of example 13, wherein the computing action comprises a publication request for publishing at least a portion of the machine learning project.

Example 15. The computer-implemented method of any of examples 13 or 14, wherein the computing action comprises an access request for accessing the third-party workspace.

Example 16. The computer-implemented method of any of the preceding examples, wherein the first-party workspace request is associated with one or more user subscriptions, and wherein the third-party workspace is generated using the one or more user subscriptions.

Example 17. The computer-implemented method of example 16, wherein the one or more user subscriptions are indicative of one or more resource permissions for the third-party computing resource, wherein the one or more resource permissions are indicative of at least one of an amount of allocated space for a user or an amount of allocated compute power for the user.

Example 18. A computing system of a first-party computing resource configured to facilitate a first stage of a machine learning project, the computing system comprising memory and one or more processors communicatively coupled to the memory, the one or more processors configured to receive a first-party workspace request that is indicative of a third-party computing resource for facilitating a second stage of the machine learning project; and in response to the first-party workspace request generate a compute agnostic project workspace hosted by the first-party computing resource that is configured to access a third-party workspace hosted by the third-party computing resource, initiate the generation of the third-party workspace, and initiate the configuration of a first-party routine set within the third-party workspace, wherein the first-party routine set comprises a plurality of callbacks for facilitating communication between the first-party computing resource and the third-party computing resource.

Example 19. The computing system of example 18, wherein the first-party workspace request is indicative of a plurality of third-party computing resources, and wherein the one or more processors are further configured to initiate the generation of a respective third-party workspace for each of the plurality of third-party computing resources; and initiate the configuration of the first-party routine set within the respective third-party workspace for each of the plurality of third-party computing resources to facilitate communication between the first-party computing resource and each of the plurality of third-party computing resources.

Example 20. One or more non-transitory computer-readable storage media including instructions that, when executed by one or more processors of a first-party computing resource configured to facilitate a first stage of a machine learning project, cause the one or more processors to receive a first-party workspace request that is indicative of a third-party computing resource for facilitating a second stage of the machine learning project; and in response to the first-party workspace request generate a compute agnostic project workspace hosted by the first-party computing resource that is configured to access a third-party workspace hosted by the third-party computing resource, initiate the generation of the third-party workspace, and initiate the configuration of a first-party routine set within the third-party workspace, wherein the first-party routine set comprises a plurality of callbacks for facilitating communication between the first-party computing resource and the third-party computing resource.

The invention claimed is:

1. A computer-implemented method performed by a first-party computing resource configured to facilitate a first stage of a machine learning project, the computer-implemented method comprising:

receiving, by one or more processors of the first-party computing resource, a first-party workspace request that is indicative of a third-party computing resource for facilitating a second stage of the machine learning project; and in response to the first-party workspace request:

generating, by the one or more processors, a compute agnostic project workspace hosted by the first-party computing resource that is configured to access a third-party workspace hosted by the third-party computing resource, initiating, by the one or more processors, a generation of the third-party workspace, and initiating, by the one or more processors, a configuration of a first-party routine set within the third-party workspace, wherein the first-party routine set comprises a plurality of callbacks for facilitating communication between the first-party computing resource and the third-party computing resource.

2. The computer-implemented method of claim 1 further comprising:

receiving, through the first-party routine set, a publication request from the third-party computing resource; and in response to the publication request:

generating evaluation data for a portion of the machine learning project within the third-party workspace by initiating the performance of one or more project quality routines from the first-party routine set within the third-party workspace, and modifying the compute agnostic project workspace based on a comparison between the evaluation data and one or more publication criteria.

3. The computer-implemented method of claim 2, wherein modifying the compute agnostic project workspace comprises:

in response to determining that the machine learning project satisfies the one or more publication criteria, generating a canonical representation of the machine learning project that comprises one or more model attributes for the machine learning project.

4. The computer-implemented method of claim 3, wherein the one or more model attributes comprise one or more model quality metrics for the machine learning project.

5. The computer-implemented method of claim 4, wherein the one or more publication criteria comprises one or more model quality thresholds indicative of an acceptable publication threshold for each of the one or more model quality metrics.

6. The computer-implemented method of claim 1, wherein the first-party workspace request is indicative of a plurality of third-party computing resources, and wherein the computer-implemented method further comprises:

initiating a generation of a respective third-party workspace for each of the plurality of third-party computing resources; and initiating a configuration of the first-party routine set within the respective third-party workspace for each of the plurality of third-party computing resources to facilitate communication between the first-party computing resource and each of the plurality of third-party computing resources.

7. The computer-implemented method of claim 1, wherein receiving the first-party workspace request comprises:

receiving a first selection input from a first selection interface hosted by the first-party computing resource, wherein the first selection input identifies a first third-party computing resource for configuring a training dataset for the machine learning project; and receiving a second selection input from a second selection interface hosted by the first-party computing resource, wherein the second selection input identifies a second third-party computing resource for configuring a model for the machine learning project.

8. The computer-implemented method of claim 7 further comprising:

providing the first selection interface for display, wherein the first selection interface comprises one or more interactive data selection widgets indicative of a first plurality of third-party computing resources for data configuration; and providing the second selection interface for display, wherein the second selection interface comprises one or more interactive compute selection widgets indicative of a second plurality of third-party computing resources for model configuration.

9. The computer-implemented method of claim 7, wherein the first third-party computing resource and the second third-party computing resource are different third-party computing resources.

10. The computer-implemented method of claim 1, wherein the compute agnostic project workspace comprises a plurality of sub-workspaces for the machine learning project, wherein each sub-workspace is associated with one of a plurality of stages of development for the machine learning project.

11. The computer-implemented method of claim 10, wherein the plurality of stages of development comprises a data preparation stage, a model experiment stage, a model review stage, and a model deployment stage.

12. The computer-implemented method of claim 10, wherein a first sub-workspace and the third-party workspace are associated with the first stage of the plurality of stages of development, and wherein the computer-implemented method further comprises:

generating a first project interface corresponding to the first stage, wherein the first project interface comprises one or more interactive third-party links to the third-party workspace.

13. The computer-implemented method of claim 12 further comprising:

receiving user input indicative of a selection of at least one of the one or more interactive third-party links; and in response to the user input, initiating, through the first-party routine set, the performance of a computing action at the third-party workspace.

14. The computer-implemented method of claim 13, wherein the computing action comprises a publication request for publishing at least a portion of the machine learning project.

15. The computer-implemented method of claim 13, wherein the computing action comprises an access request for accessing the third-party workspace.

16. The computer-implemented method of claim 1, wherein the first-party workspace request is associated with one or more user subscriptions, and wherein the third-party workspace is generated using the one or more user subscriptions.

17. The computer-implemented method of claim 16, wherein the one or more user subscriptions are indicative of one or more resource permissions for the third-party computing resource, wherein the one or more resource permissions are indicative of at least one of a first amount of allocated space for a user or a second amount of allocated compute power for the user.

18. A computing system of a first-party computing resource configured to facilitate a first stage of a machine learning project, the computing system comprising memory and one or more processors communicatively coupled to the memory, the one or more processors configured to:

receive a first-party workspace request that is indicative of a third-party computing resource for facilitating a second stage of the machine learning project; and in response to the first-party workspace request:

generate a compute agnostic project workspace hosted by the first-party computing resource that is configured to access a third-party workspace hosted by the third-party computing resource, initiate a generation of the third-party workspace, and initiate a configuration of a first-party routine set within the third-party workspace, wherein the first-party routine set comprises a plurality of callbacks for facilitating communication between the first-party computing resource and the third-party computing resource.

19. The computing system of claim 18, wherein the first-party workspace request is indicative of a plurality of third-party computing resources, and wherein the one or more processors are further configured to:

initiate a generation of a respective third-party workspace for each of the plurality of third-party computing resources; and initiate a configuration of the first-party routine set within the respective third-party workspace for each of the plurality of third-party computing resources to facilitate communication between the first-party computing resource and each of the plurality of third-party computing resources.

20. One or more non-transitory computer-readable storage media including instructions that, when executed by one or more processors of a first-party computing resource configured to facilitate a first stage of a machine learning project, cause the one or more processors to:

receive a first-party workspace request that is indicative of a third-party computing resource for facilitating a second stage of the machine learning project; and in response to the first-party workspace request:

generate a compute agnostic project workspace hosted by the first-party computing resource that is configured to access a third-party workspace hosted by the third-party computing resource, initiate a generation of the third-party workspace, and initiate a configuration of a first-party routine set within the third-party workspace, wherein the first-party routine set comprises a plurality of callbacks for facilitating communication between the first-party computing resource and the third-party computing resource.

* * * * *